United States Patent [19]
Fukuda

[11] Patent Number: 5,467,353
[45] Date of Patent: Nov. 14, 1995

[54] SUBRATE CONTROL CHANNEL EXCHANGE SYSTEM

[75] Inventor: Keiji Fukuda, Kawasaki, Japan

[73] Assignee: Fujitsu Limited, Kawasaki, Japan

[21] Appl. No.: 171,682

[22] Filed: Dec. 22, 1993

[30] Foreign Application Priority Data

Dec. 29, 1992  [JP]  Japan ................................. 4-361494

[51] Int. Cl.⁶ ..................................................... H04J 3/12
[52] U.S. Cl. ........................................................ 370/110.1
[58] Field of Search ............................ 370/110.11, 94.1, 370/60, 58.1, 112, 58.3, 58.2; 379/94, 95, 96, 97, 14, 137, 207, 229, 231, 232, 234, 235, 240

[56] References Cited

U.S. PATENT DOCUMENTS 5,319,637   6/1994   Taniguchi et al. ................... 370/110.1

Primary Examiner—Douglas W. Olms
Assistant Examiner—Dang Ton
Attorney, Agent, or Firm—Staas & Halsey

[57] ABSTRACT

The subrate control channel exchange system uses a part of bits in a control channel time slot, for example, an 8-bit time slot in transmitting communications control data, and uses the rest of the bits in transmitting communications data such as voice, etc. For example, even if the transmission speed of a transmission line is 64 kb/s, the present invention aims at improving the utilization of the line when a speed of approximately 16 kb/s is applicable. In an ISDN network, which establishes communications by multiplexing communications data applied from a source terminal unit to a destination terminal unit over an exchange network together with communications control data, the present invention comprises a subrate exchange trunk for multiplexing in a single time slot only significant bits in low speed data applied from a plurality of low speed terminals connected to the exchange network, and a bit unit exchange switching unit for multiplexing in a control channel time slot an output of the subrate exchange trunk together with control data of fewer than 8 bits.

15 Claims, 32 Drawing Sheets

SUBRATE CONTROL CHANNEL EXCHANGE SYSTEM

BACKGROUND OF THE INVENTION

1. Field of the Invention

This invention pertains to a subrate exchange system for use in a digital communications network, and more particularly to a subrate control channel exchange system using some bits in time slots of control channels for transmitting a control signal and the remaining bits for transmitting a voice signal.

2. Description of the Related Art

A time-divisional digital exchange generally exchanges data in 8-bit units. Yet, there are cases in which not all the bits in such data are significant. There is a need, in those cases, for improving an efficiency in line utilization by sending and receiving only significant data in 8-bit units by multiplexing the exchange of individual bits, i.e. a subrate exchange, by an exchange.

Recent events, such as digitization of public networks as an ISDN, the advent of intracorporate high speed digital communications networks, and the prevalence of various data terminals (e.g. personal computers), cause increases not only in voice communications by telephone sets but also in data communications amongst data terminals or between data terminals and host computers.

This necessitates an intercorporate and intercorporate transmission line network to evolve from a conventional analog transmission line network into a digital transmission line network to be further built as a private ISDN network from the standpoint of service improvement and future enhancement.

FIG. 1 shows an exemplary configuration of an intracorporate communications network. Ordinarily, an ISDN primary rate interface (ISDN-PRI), as in a so-called 23B+D format, uses, as the D channel for transmitting control signals, one [1] of the twenty-four [24] channels as line numbers of transmission paths and the remaining twenty-three [23] channels, for example, for transmitting voice signals. These twenty-four [24] channels have a transmission speed of sixty-four kilobits per second [64 kbps].

For instance, in the example shown in FIG. 1, although data are transmitted between a head office 90 and branch offices 91, over main lines 92, by fully taking advantage of all 23 B channels and a D channel, there are few instances in which such high speed communications are required between liaison 93 offices and sub-branch offices 94, where low speed data transfers approximating personal computer communications would accomplish the job. Therefore, local lines 96 are used.

That is, although one [1] line has hitherto allowed one [1] sequence of data communications when communications are modulated into analog modem signals for exchanging data, a digital communications path, especially an ISDN, has come to ensure a 64 kbps data communications throughput, and the demand for a high-speed data communications such as 48 kbps, 58 kbps, 64 kbps, etc. has been satisfied. Nevertheless, there are cases in which low speed data transfers far below 64 kbps, e.g. 1.2 kbps, 2.4 kbps, 4.8 kbps, 9.6 kbps and 19.2 kbps, are required, where a data transfer pursuant to the CCITT advised v.110 format is needed.

In those cases, an 8-bit transfer carries only one [1] bit, two [2] bits or four [4] bits of significant data, thereby lowering the line efficiency.

FIGS. 2 and 3 conceptually show a conventional exchange system. FIG. 2 shows multiplexing. FIG. 3 shows in parts (a) through (e) an example of the bit structures of respective channels.

That is, as shown in FIG. 2, a multiplexer (MPX) 112 multiplexes data Da, Db, Dc and Dd having speeds of 1.2 kbps, 1.2 kbps, 2.4 kbps and 1.2 kbps from terminals 111a, 111b, 111c and 111d, respectively, for transmission as data De having a speed of 64 kbps.

In this case, when data Da through Dd from respective channels are converted "as is" to 64 kbps data only the least significant bit B0 amongst 8-bit data B0 through B7 contains a significant datum, as shown in parts (a) through (d) of FIG. 3.

Therefore, there is a desire to realize a subrate exchange for a bit unit multiplexed transmission over a single channel, which exchanges data Da through Dd from plural low speed terminals, as shown in part (e) of FIG. 3.

Such a subrate exchange is effective in raising the efficiency in line utilization of a digital communications network, namely in improving the usage per line.

FIG. 4 is a block diagram showing the configuration of a conventional ISDN transmission line trunk in a 23+D format. In FIG. 4, the transmission line trunk 1 is connected to an exchange network (NW) 2 for exchanging data from a terminal and a call processor (CPR) 3 for exchanging data e.g. from a terminal. The transmission line trunk 1 comprises a line processor (LPR) 4 for controlling the transmission line trunk 1 pursuant to an instruction from the CPR 3; a D channel terminator 5 for terminating a D channel for transmitting control data; a switch 6 (SW ⑥) for multiplexing B channel data inputted from the exchange network (NW) 2 with D channel data inputted from the D channel terminator 5; and an ISDN-PRI (primary rate interface) terminator 7 provided between the switch 6 and an ISDN transmission line trunk 9.

FIG. 5 illustrates signals flowing in FIG. 4 during each step of multiplexing twenty-three [23] channels of B channel data with one [1] channel of D channel data in a single frame for transmission to a terminating office and of demultiplexing 24 channels of data sent from an originating office into B channel data and D channel data. In FIGS. 4 and 5, these operations are performed in accordance with the following procedures ① through ⑥.

① On receiving an instruction from the CPR (call processor) 3, the LPR (line processor) 4 has the D channel terminator 5 create a D channel signal (a).

② The SW 6 (switch ⑥) combines D channel signal (a) with B channel data signal (b) from the NW 2, thereby creating serial data (c).

③ The ISDN-PRI terminator 7 attaches an F bit to the serial data (c) in conformance with a transmission format, thereby generating transmission serial data (d).

④ The ISDN-PRI terminator 7 transmits the transmission serial data (e) through an ISDN transmission line to the terminating office.

⑤ In a reverse processing, the ISDN-PRI terminator 7 eliminates the F bit from reception serial data (e) from the originating office, thereby creating serial data (f), which the SW 6 demultiplexes into B channel data (g) and a D channel signal (h).

⑥ The SW 6 supplies to the NW 2 B channel data thus demultiplexed and to the D channel terminator 5 D channel signal (h). The LPR 4 supplies to the CPR 3 D channel signal (h) processed by the D channel terminator 5.

As described above, when communications are performed in a 23B+D format, the D channel also possess a capability for transmitting a 64 kbps control signal. In the example shown in FIG. 1, even though transmission paths between the head office and the branch offices may necessitate a capability of transmitting a 64 kbps control signal, those between a branch office and its sub-branch offices or those between a sub-branch office and its liaison offices may not, and a transmission speed of 32 kbps or even 16 kbps may suffice for these transmission paths. Hence, there has been an inherent problem that the only four [4] or two [2] bits of the eight [8] bits in a D channel signal actually carry significant control data with the remaining bits unused, which lowers an efficiency of line utilization.

SUMMARY OF THE INVENTION

This invention aims at improving an efficiency in line utilization by applying a subrate exchange system not only to B channel data such as a voice signal but also to D channel data for transmitting a control signal.

A feature of the present invention resides in a subrate control channel exchange system for use with an exchange device in a communications network for establishing communications by multiplexing communications data applied from a source terminal unit to a destination terminal unit over an exchange network together with communication control data. The exchange device comprises subrate switch trunk unit for extracting only significant bits from low speed communications data applied from a plurality of low speed terminal units connected to the exchange network, multiplexing the significant bits in a time slot corresponding to a channel comprising a predetermined number of bits in the communications network and outputting them, and demultiplexing the significant data in the reverse processing order and bit unit exchange switching unit for multiplexing an output of the subrate exchange trunk unit together with said communication control data of fewer than said predetermined number of bits.

BRIEF DESCRIPTION OF THE DRAWINGS

One skilled in the art can easily understand additional features and objects of this invention from the description of the preferred embodiments and some of the attached drawings. In the drawings.

DESCRIPTION OF THE PREFERRED EMBODIMENT

Figure 6:
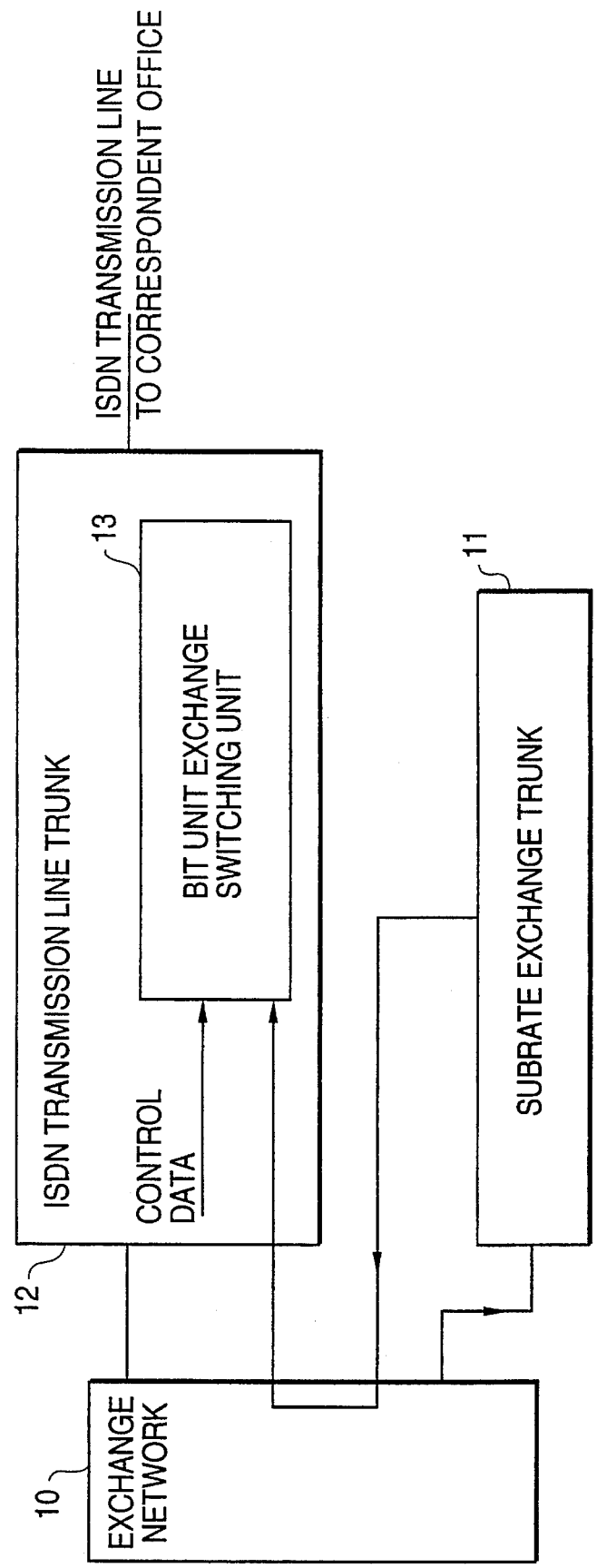
FIG. 6 is a block diagram of a first embodiment.
Figure 7:
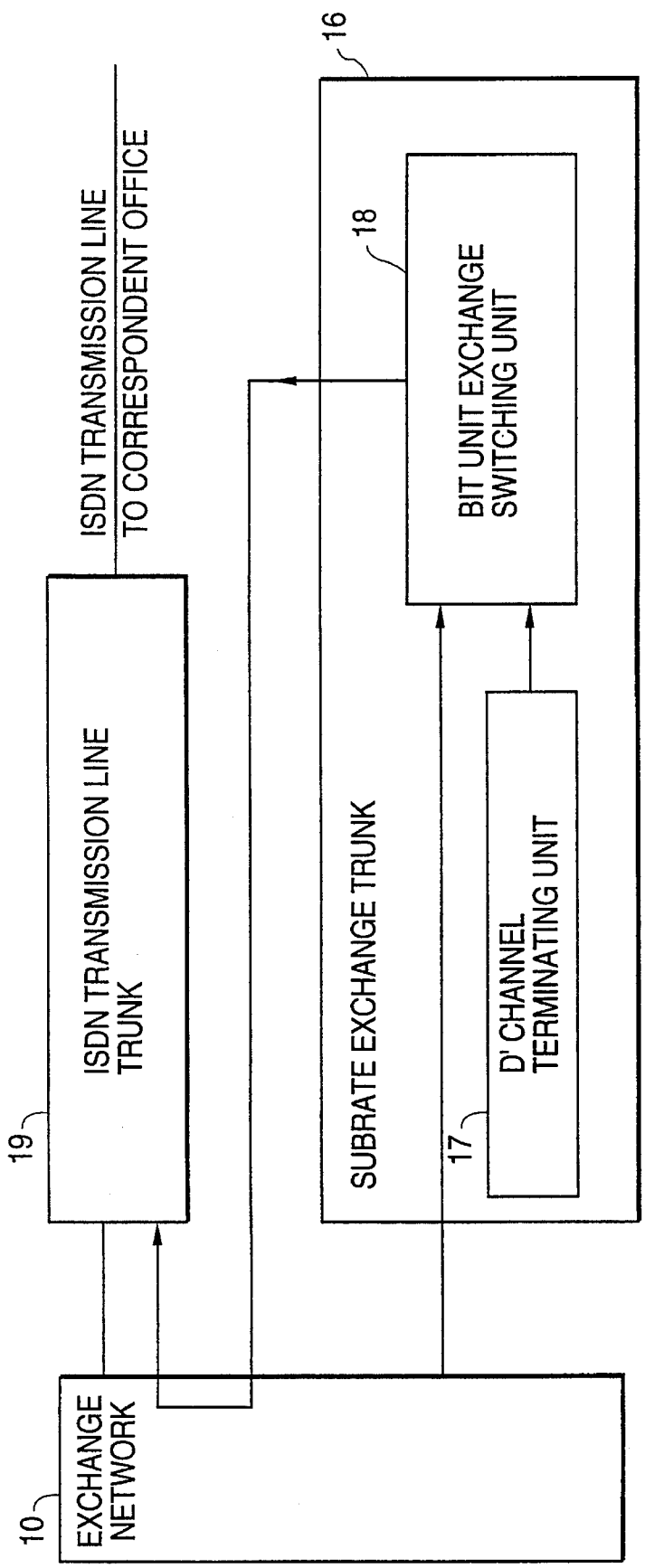
FIG. 7 is a block diagram of a second embodiment.

FIG. 6 is a block diagram of a first embodiment. FIG. 7 is a block diagram of a second embodiment. These show the principles of subrate control channel exchange systems for use in an ISDN network comprising a subrate exchange trunk 11. The subrate exchange trunk 11 extracts only significant bits from low speed data inputted through an exchange network 10 from a plurality of low speed terminals, multiplexes them over a time slot corresponding to a single channel having a predetermined number of bits for the ISDN network and demultiplexes the multiplexed data into significant data in a reverse processing.

In FIG. 6 showing the principle of the first embodiment, a bit unit exchange switching unit 13, provided in an ISDN transmission line trunk 12 for outputting to the terminating office B channel data inputted from the exchange network 10 as transmission data to a terminating terminal multiplexed with D channel data for transmitting a control signal, multiplexes data with fewer than predetermined bits e.g. eight [8] bits, which is outputted from the subrate exchange trunk 11 with control data e.g. over a single time slot. The bit unit exchange switching unit 13 comprises two [2] two-port random access memories, a selector and a counter.

In FIG. 7 showing the principle of the second embodiment, a subrate exchange trunk 16 comprises a D' channel terminating unit 17 and a bit unit exchange switching unit 18. The D' channel terminating unit 17 terminates control data having fewer than the predetermined number of bits, e.g. eight [8] bits. The bit unit exchange switching unit 18 multiplexes an output from the D' channel terminating unit 17 with significant bits in the low speed data e.g. over to a single time slot for their output to an ISDN transmission line trunk 19. The name of a "D' channel" is used to clearly discriminate a channel through which control data for 1 time slot, for example, of fewer than 8 bits, are transmitted from the D channel in which predetermined 8-bit control data are transmitted.

This invention also assumes a branch network structure e.g. shown in FIG. 6. For example, when a transmission speed of 64 kbps for transmitting control data, i.e. D channel data, is not required between a sub-branch office and liaison offices, this invention enables, of the eight [8] bits corresponding to a D' channel signal, e.g. four [4] bits to be used for transmitting control data and the remaining four [4] bits to be used for transmitting significant bits of low speed multiplexed over a single time slot being inputted from the subrate exchange trunk 11, as shown in FIG. 6.

Further, in FIG. 6, the bit unit exchange switching unit 13 multiplexes the fewer than the predetermined control data with eight [8] bits, e.g. four [4] bits of D' channel data with four [4] bits of B' channel data outputted from the subrate exchange trunk 11, over a single time slot for their output from the ISDN transmission line trunk 12 to the terminating office. The bit unit exchange switching unit 13 acts as an 8-bit switch in a 64 kbps transmission mode, but may also act as a 4-bit switch in a 32 kbps transmission mode or a 2-bit unit switch in a 16 kbps transmission mode, thereby realizing a subrate control channel exchange.

Pursuant to the second embodiment whose principles are shown in FIG. 7, the subrate exchange trunk 16 has the bit unit exchange switching unit 18 multiplex e.g. four [4] bits of control data of B' channel and four [4] bits of data aggregating significant bits in low speed data over a single time slot for an output to the ISDN transmission line trunk 19. When the transmission line trunk 19 has eight [8] bits of D channel data to be transmitted, the D channel data are inserted into a time slot, different from that for an output from the subrate exchange trunk 16, to be built into a frame for an output to the terminating office.

As described above, this invention enables remaining bits in a time slot to be used e.g. for transmitting voice data when control data have fewer bits than a predetermined number of bits for a single time slot, i.e. eight [8] bits in this case.

Figure 8:
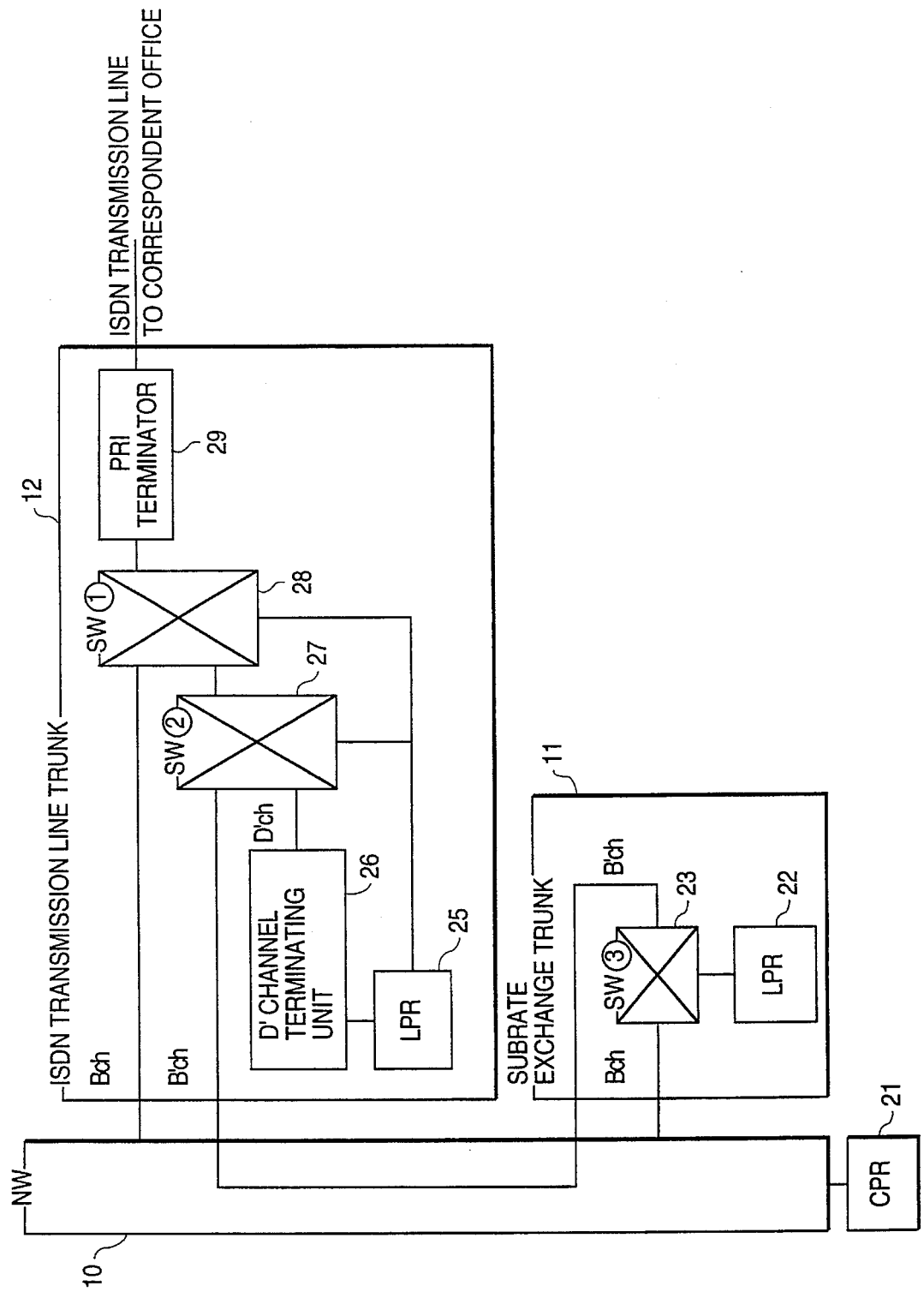
FIG. 8 is a block diagram illustrating the configuration of the first embodiment.

FIG. 8 is a block diagram illustrating the configuration of the first embodiment. Parts shown in FIG. 8 that are the same as those shown in FIG. 6 have the same numbers. A call processor (CPR) 21 for controlling the exchange network 10 is provided additionally to the structural elements shown in FIG. 6. The subrate exchange trunk 11 comprises a line processor (LPR) 22 controlled through the exchange network 10 by the CPR 21 and a switch (SW③) 23 for multiplexing over to a single time slot corresponding to a B' channel plural low speed B channel data, e.g. personal computer communications data, inputted through the exchange network 10 from plural low speed terminals (not shown).

The ISDN transmission line trunk 12 comprises a line processor (LPR) 25 controlled through the exchange network 10 by the CPR 21, a D' channel terminator 26 for terminating a D' channel signal (e.g. in four [4] bits) as control data, a switch (SW②) 27 for multiplexing B' channel data (e.g. in four [4] bits) outputted from the subrate exchange trunk 11 and D' channel data outputted from the D' channel terminator 26 over to a single time slot, a switch (SW①) 28 for building a single frame by multiplexing an output from SW② 27 with B Channel data inputted from the exchange network 10 (e.g. B channel data whose all eight [8] bits contain significant data), and a PRI terminator 29 provided between SW① 28 and an ISDN transmission line for attaching an F bit to the head end of a frame.

Figure 9:
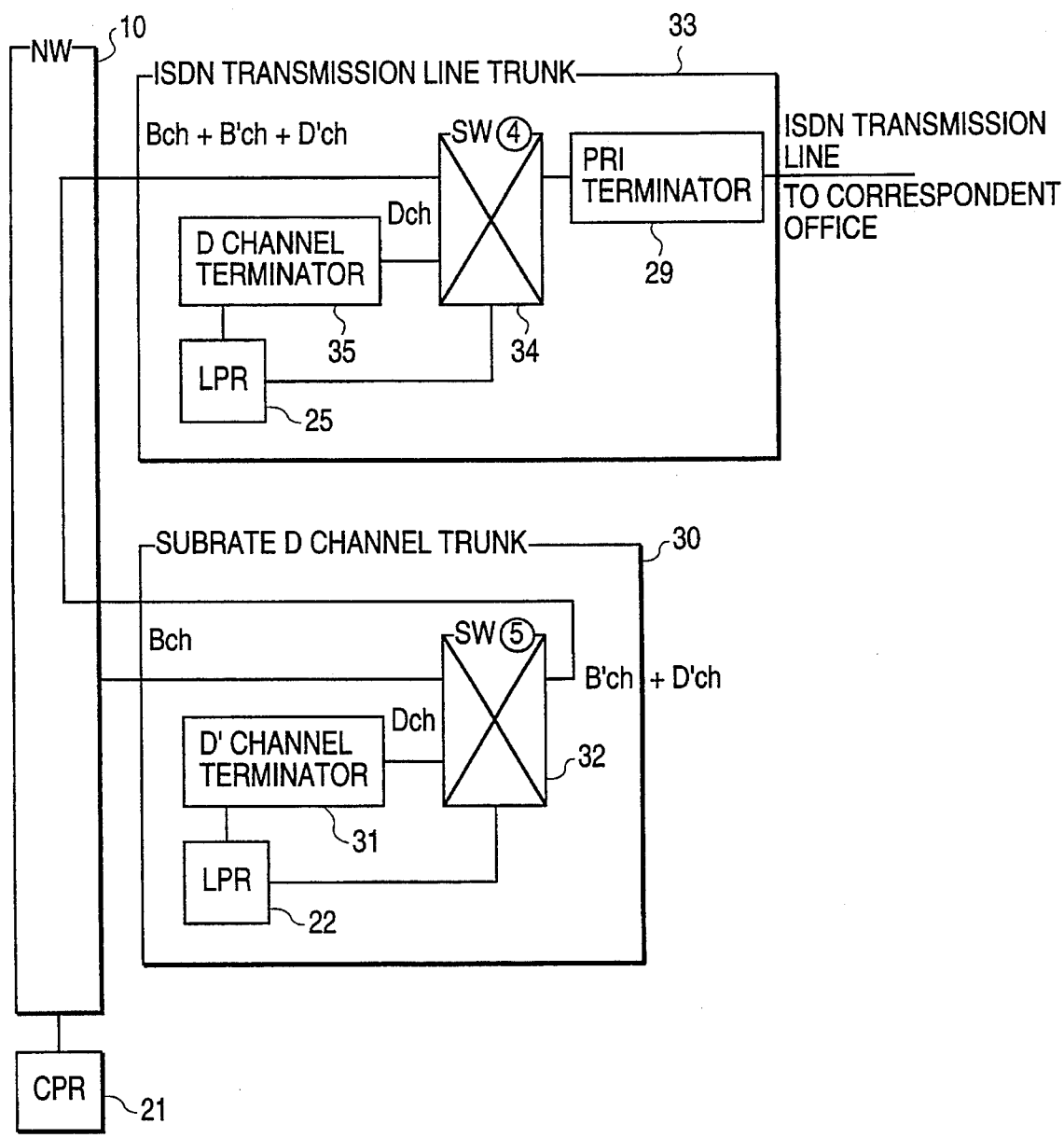
FIG. 9 is a block diagram illustrating the configuration of the second embodiment.

FIG. 9 is a block diagram illustrating the configuration of the second embodiment. In FIG. 9, a subrate D channel trunk 30, corresponding to a subrate exchange trunk, includes a D' channel terminator 31 for terminating a D' channel signal as control data having fewer than eight [8] bits in a single time slot. The subrate D channel trunk 30 also includes a switch (SW⑤) 32 which multiplexes B channel data representing the significant bits of low speed data with D' channel data e.g. over to a single time slot for their output as B'+D' channel data to an ISDN transmission line trunk 33.

The ISDN transmission line trunk 33 comprises only one [1] switch, a switch SW④ 34, unlike the structure shown in FIG. 8. SW④ multiplexes, to provide an output to the PRI terminator 29, B'+D' channel data outputted from the subrate D channel trunk 30, B channel data, e.g. B+B'+D' channel data inputted by the exchange network, and D channel data whose all eight [8] bits as an output from the D channel terminator 35 are significant.

Figure 10:
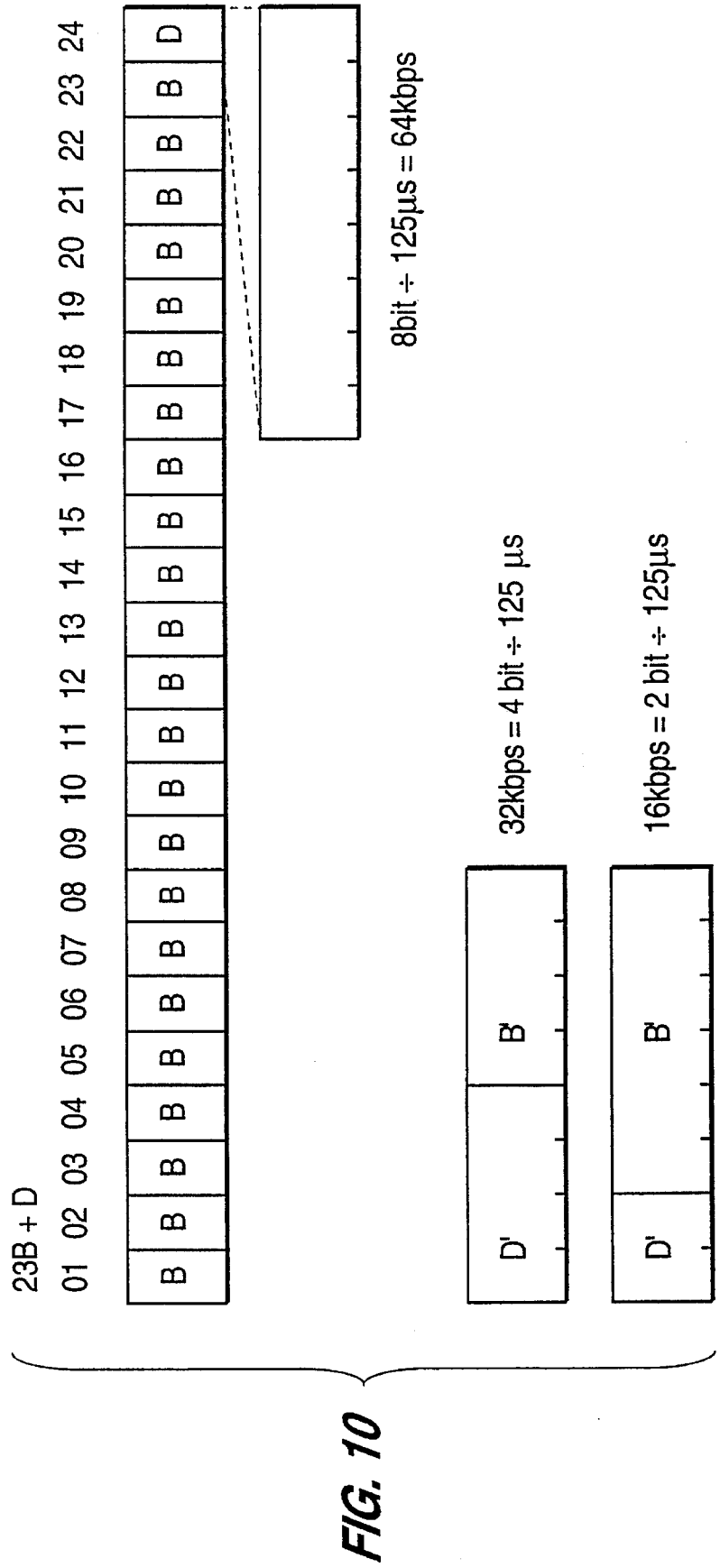
FIG. 10 shows an embodiment of a channel structure in this invention.

FIG. 10 shows an embodiment of a channel structure. In FIG. 10, twenty-three [23] channels, of twenty-four [24] channels representing line numbers of transmission paths, are used as B channels and the one [1] remaining channel is used as a D channel. A single channel has eight [8] bits which may be used for transmitting control data en toto. However, when a transmission speed of thirty-two kilobits per second [32 kbps] suffices for control data, four [4] bits out of the eight [8] bits, or when a transmission speed of sixteen kilobits per second [16 kbps] suffices for control data, two n[2] bits out of the eight [8] bits can be used for a B' channel e.g., for transmitting voice data with the rest used for a D' channel for transmitting control data.

Figure 11:
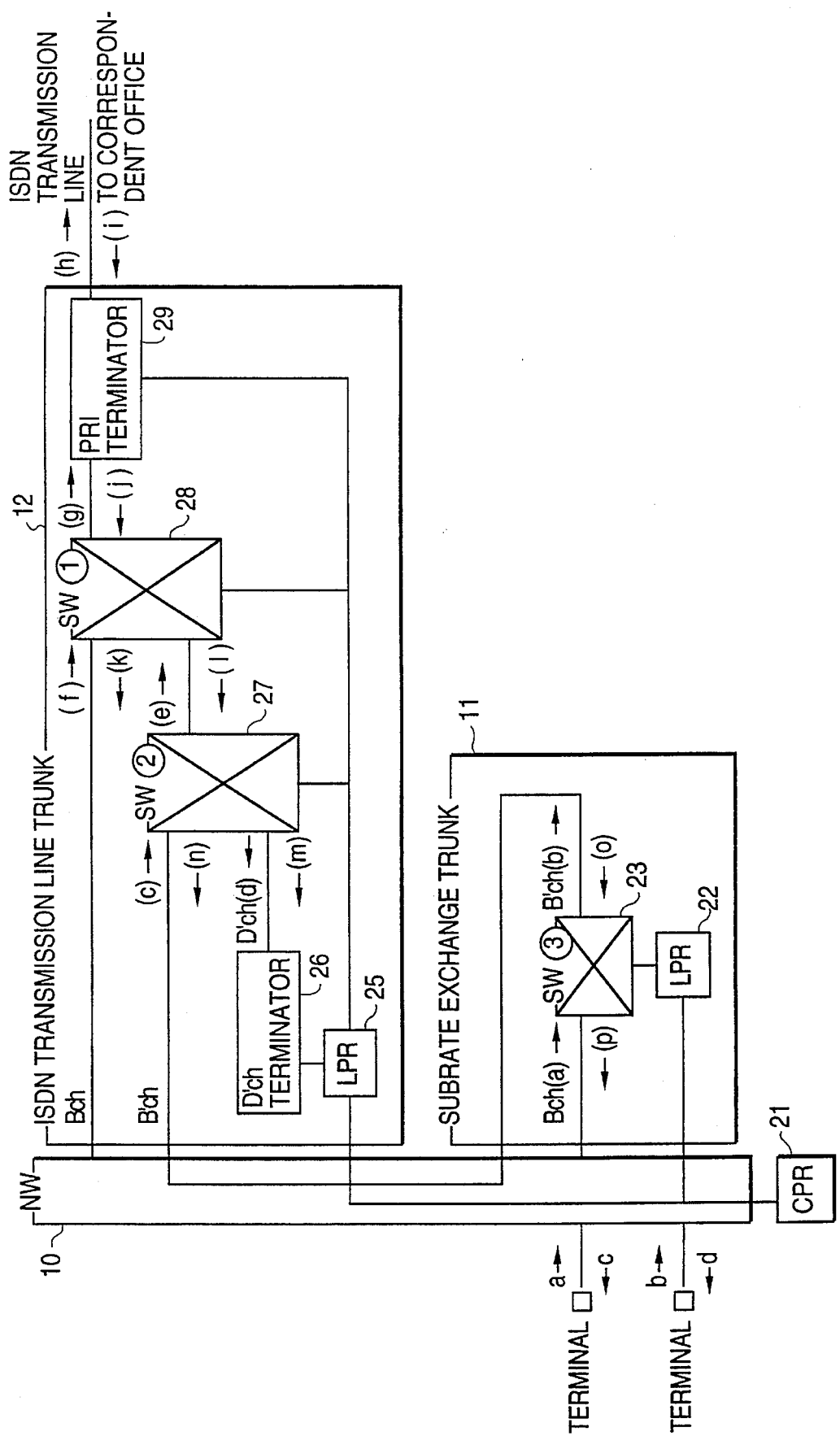
FIG. 11 is an explanatory chart showing the flow of signals in the first embodiment.

FIG. 11 is an explanatory chart showing the flow of signals in the first embodiment. FIG. 11 shows the same configuration as shown in FIG. 8, except that terminals connected to the exchange network 10 are illustrated and that respective parts of the subrate exchange trunk 11 and the ISDN transmission line trunk 12 have their numbers assigned.

Figure 12:
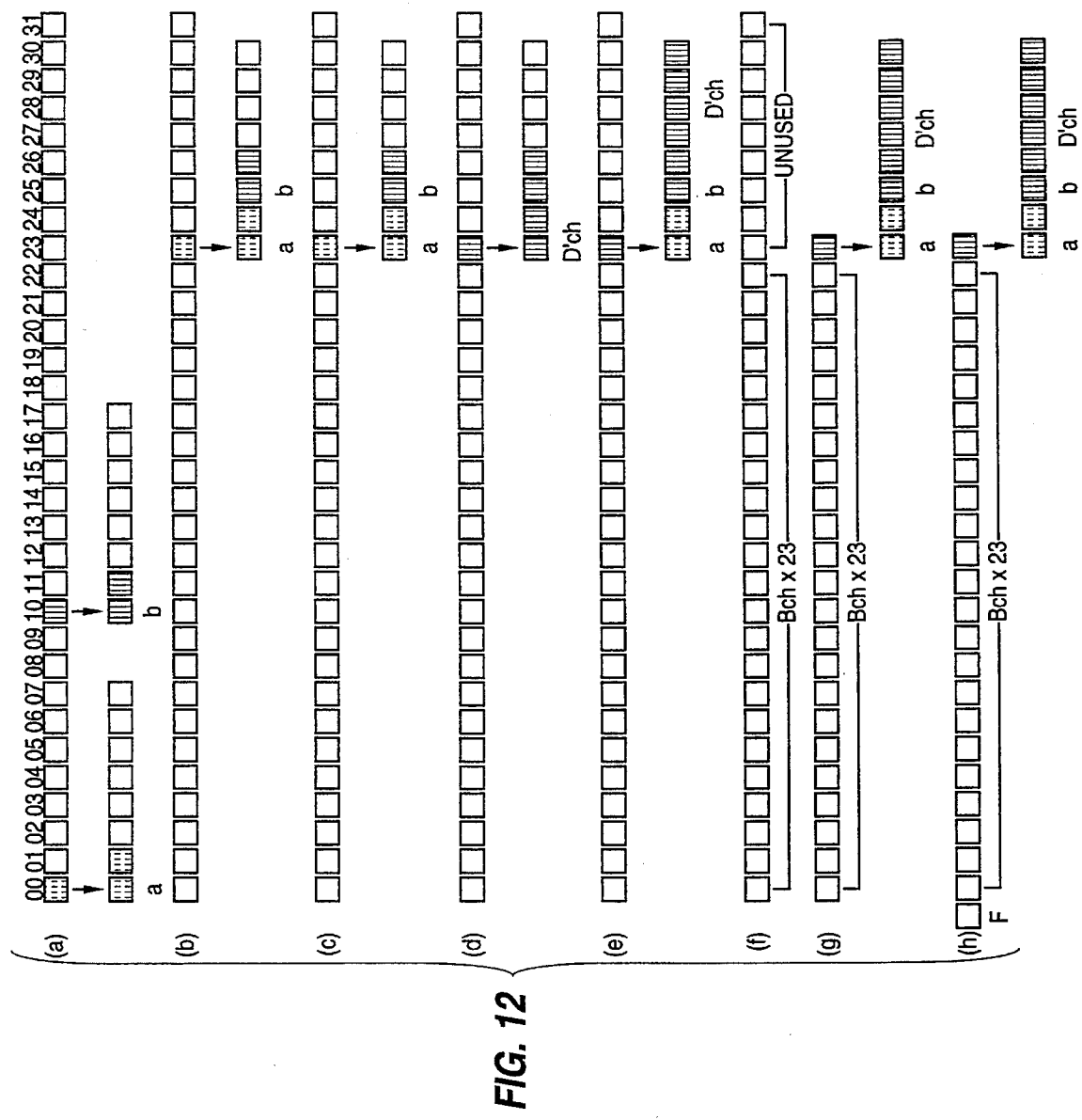
FIG. 12 illustrates the flow of output data to the corresponding office shown in FIG. 11.
Figure 13:
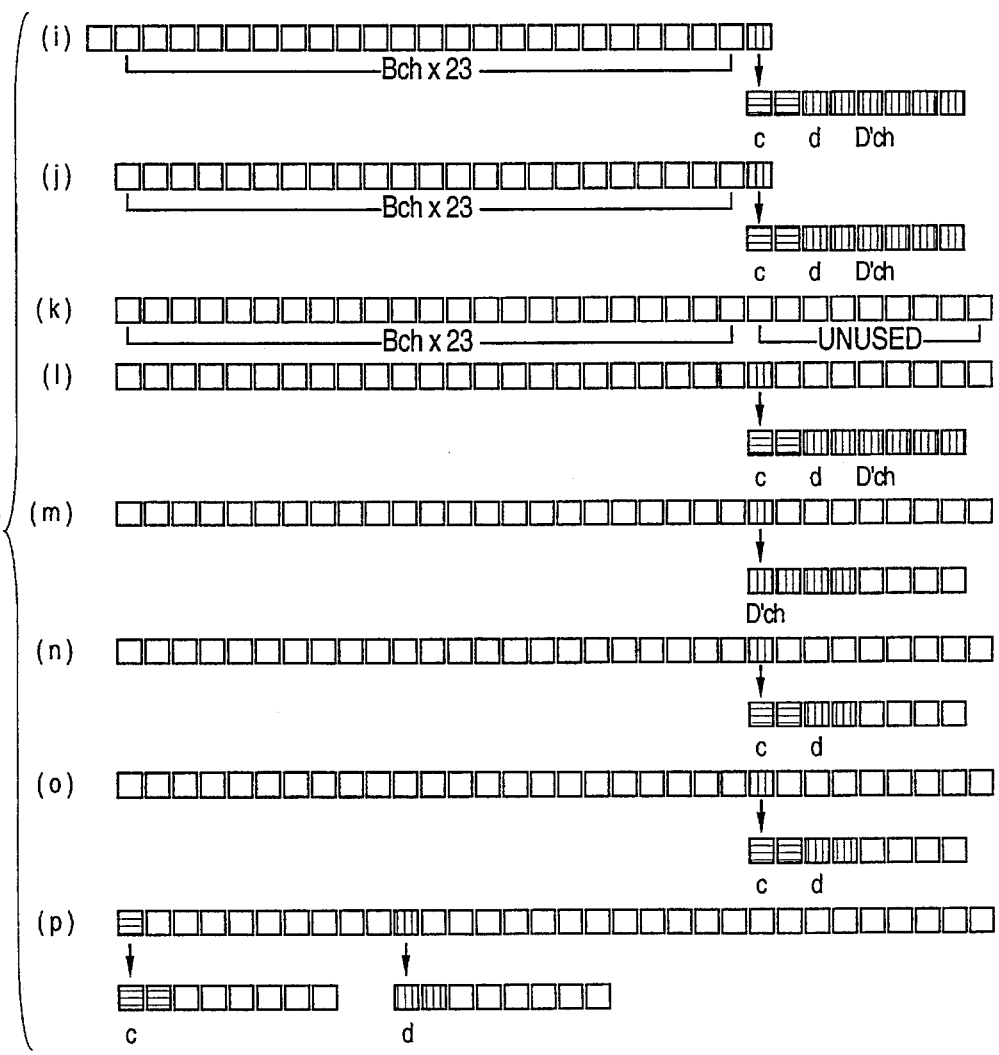
FIG. 13 illustrates the flow of input data from the corresponding office shown in FIG. 11.

FIG. 12 illustrates the flow of output data to the corresponding office shown in FIG. 11. FIG. 13 illustrates the flow of input data from the corresponding office shown in FIG. 11. The data flows in FIG. 11 are illustrated by next procedures ① through ⑩.

① On receiving 16 kbps 2-bit data a and b as a signal (a), the subrate exchange trunk 11 has SW(3) 23 multiplex them over a single time slot (1TS) as a signal (b).

② On receiving an instruction from the CPR (call processor) 21, the line processor (LPR) 25 has the D' channel terminator 26 generate a 32 kbps 4-bit D' channel signal (d).

③ SW② 27 combines D' channel signal (d) with B' channel signal (c) from the exchange network 10 into serial data (e).

④ SW① 28 combines serial data (e), obtained c by combining B' channel signal (c) with D' channel signal (d), with a B channel signal (f) from the exchange network 10 into serial data ⑤ The ISDN-PRI terminator. 29 attaches an F bit to serial data (g) in conformance with a transmission format, thereby generating transmission serial data (h).

⑥ The ISDN-PRI terminator 29 transmits transmission serial data (h) through an ISDN transmission line to the terminating office.

⑦ In a reverse processing, the ISDN-PRI terminator 29 eliminates an F bit from reception serial data (i) from an originating office, thereby generating serial data (j). Then, the ISDN-PRI terminator 29 has SW① 28 demultiplex serial data (j) into B channel data (k) and combined B'+D' channel data (1).

⑧ SW② 27 further demultiplexes B'+D' channel data (1) into B' channel data (n) and D' channel data (m).

⑨ The D' channel terminator 26 processes D' channel data (m), thereby generating B' channel data (o) and LPR 25 notifies the CPR 21 of B' channel data (o).

⑩ The subrate exchange trunk 11 has SW③ 23 demultiplex B' channel data (o)into (p) to be outputted, e.g., to terminals, through the exchange network 10.

Figure 14:
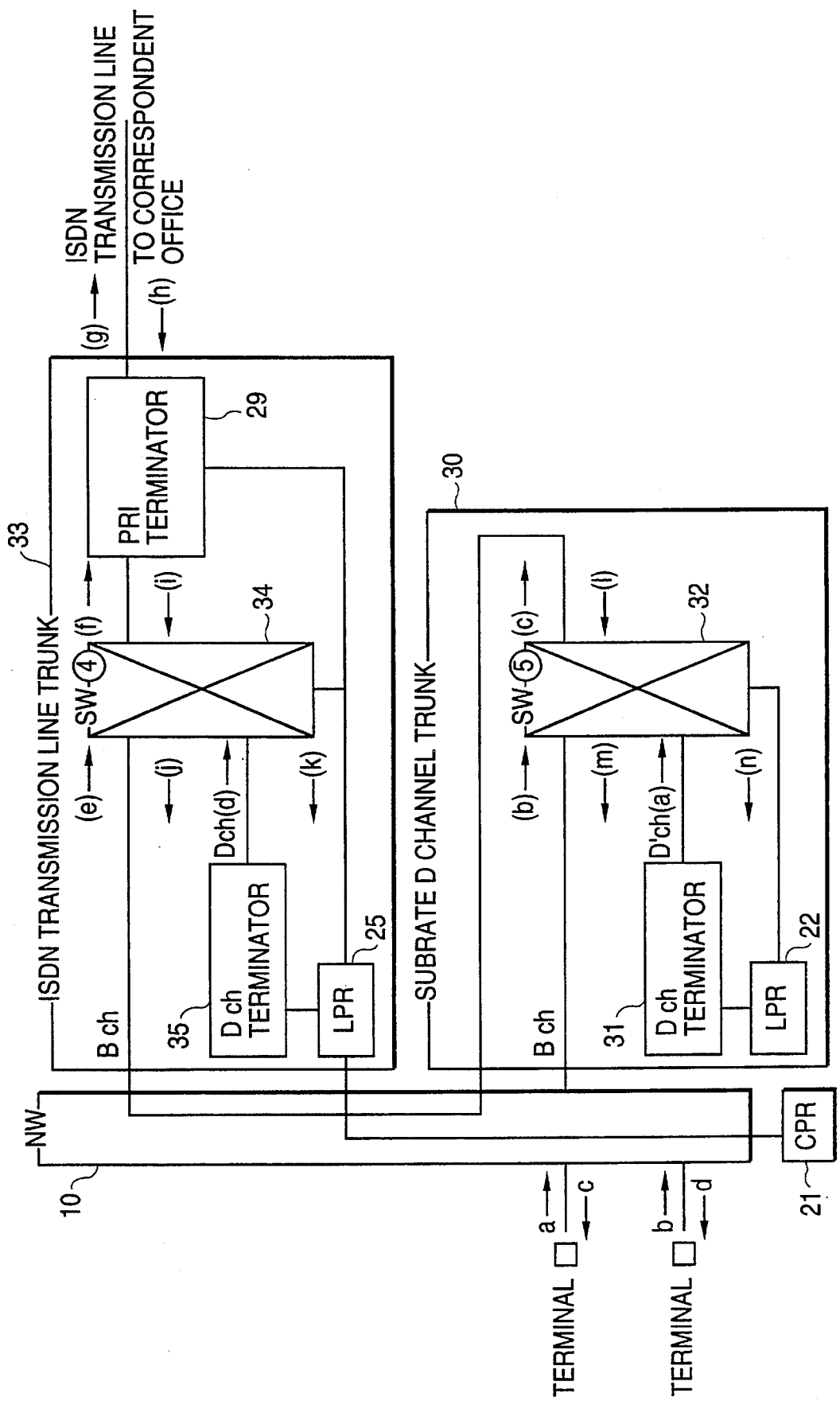
FIG. 14 is an explanatory chart showing the flow of signals in the second embodiment.
Figure 15:
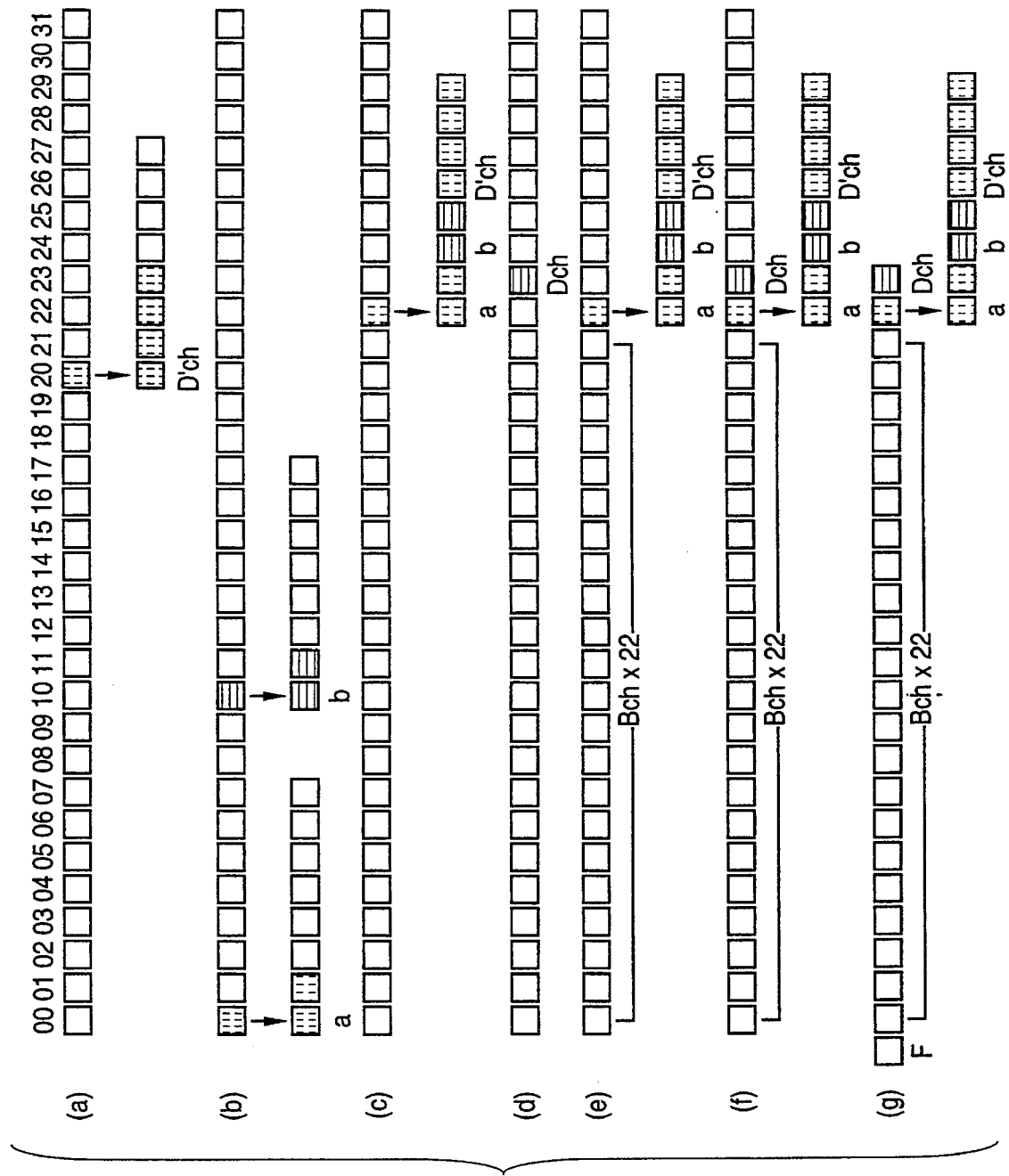
FIG. 15 illustrates the flow of output data to the corresponding office shown in FIG. 14.
Figure 16:
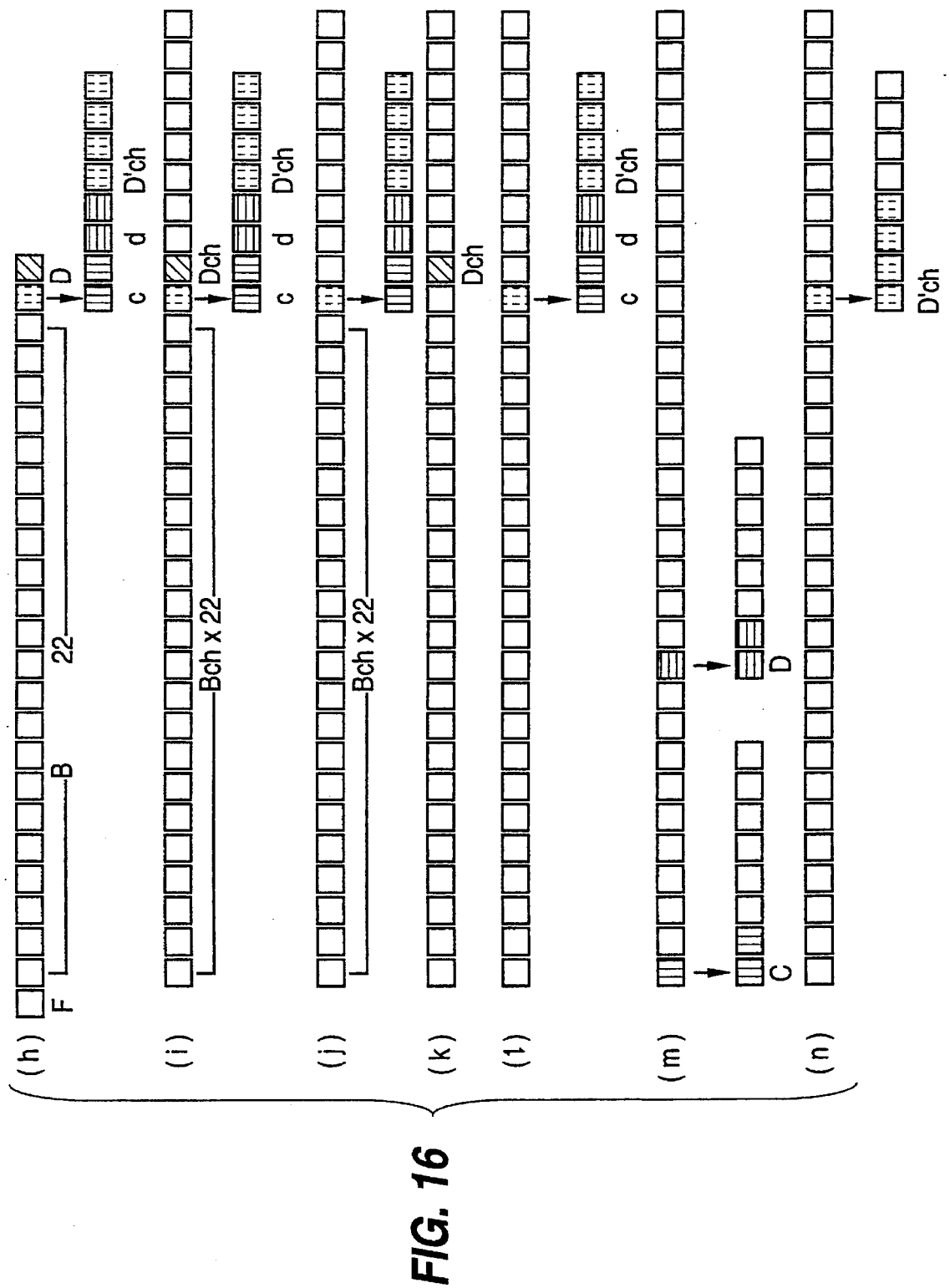
FIG. 16 illustrates the flow of input data from the corresponding office shown in FIG. 14.

FIG. 14 is an explanatory chart showing the flow of signals shown in FIG. 9 as the second embodiment. FIG. 15 illustrates the flow of output data to the corresponding office shown in FIG. 14. FIG. 16 illustrates the flow of input data from the corresponding office shown in FIG. 14. Data flows are explained with reference to these drawings according to next procedures ① through ⑧.

① On receiving an instruction from the CPR (call processor) 21, a subrate D channel trunk 30 has a D' channel terminator 31 generate D' channel signal (a).

② The subrate D channel trunk 30 receives 16 kbps 2-bit data a and b such as a signal (b), and has SW⑤ 32 multiplex them with D' channel data of signal (a) over a single time slot (1TS).

③ On receiving an instruction from the CPR 21, the transmission line trunk 33 has LPR 25 control a D channel terminator 35 for generating a D channel signal (d).

④ SW④ 34 converts the D channel signal (d) and a B channel and B'+D' channel signal (e) from the exchange network 10 into serial data (f).

⑤ The ISDN-PRI terminator 29 attaches an F bit to serial data (f) in conformance with a transmission format, thereby generating transmission serial data (g)

⑥ The ISDN-PRI terminator 29 transmits transmission serial data (g) through an ISDN transmission line to the terminating office.

⑦ In a reverse processing, the ISDN-PRI terminator 29 eliminates an F bit from reception serial data (h) from an originating office, thereby generating serial data (i). Then, the ISDN-PRI terminator 29 has SW④ 34 demultiplex serial data (i) into D channel data (k) and combined B channel and B'+D' channel data (j), with the former supplied to the exchange network 10 and the latter to a D channel terminator 35 to be processed and the LPR 25 notifies the CPR 21 of the result.

⑧ The subrate D channel trunk 30 has SW⑤ 32 further demultiplex B'+D' channel data ① into B channel data (m) and D' channel data (n), with the former supplied to terminals as c+d through the exchange network 10 and the latter supplied to the D' channel terminator 31, and LPR 22 notifies the CPR 21 of the result.

Figure 17:
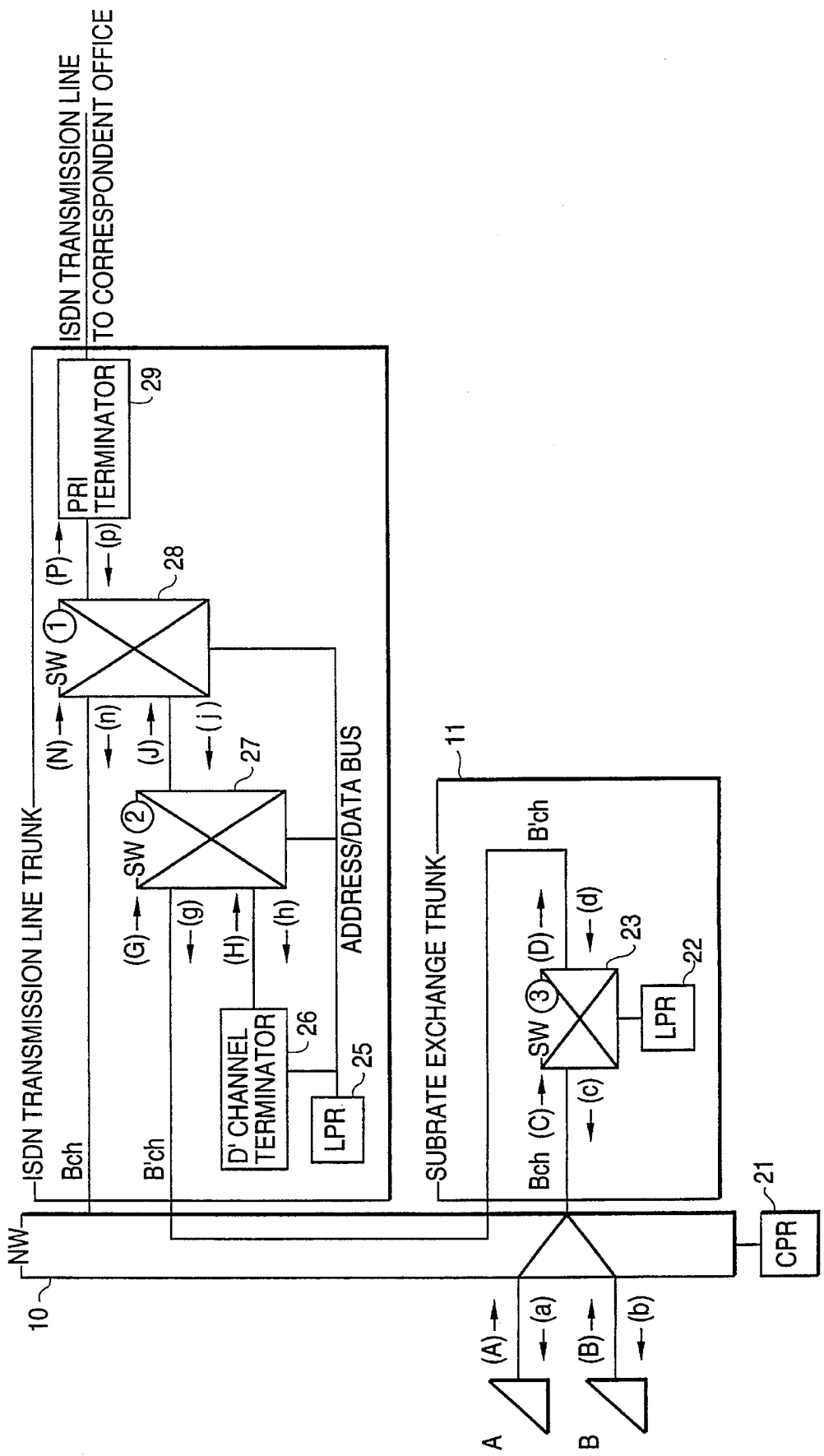
FIG. 17 illustrates in further detail the flow of signals in the first embodiment.

FIG. 17 illustrates in further detail the flow of signals in the first embodiment.

Although signals shown in FIG. 17 have different numbers than those in FIG. 11 for the sake of convenience, the structure of a subrate exchange trunk and an ISDN transmission line trunk is essentially the same as that shown in FIG. 11.

Figure 18:
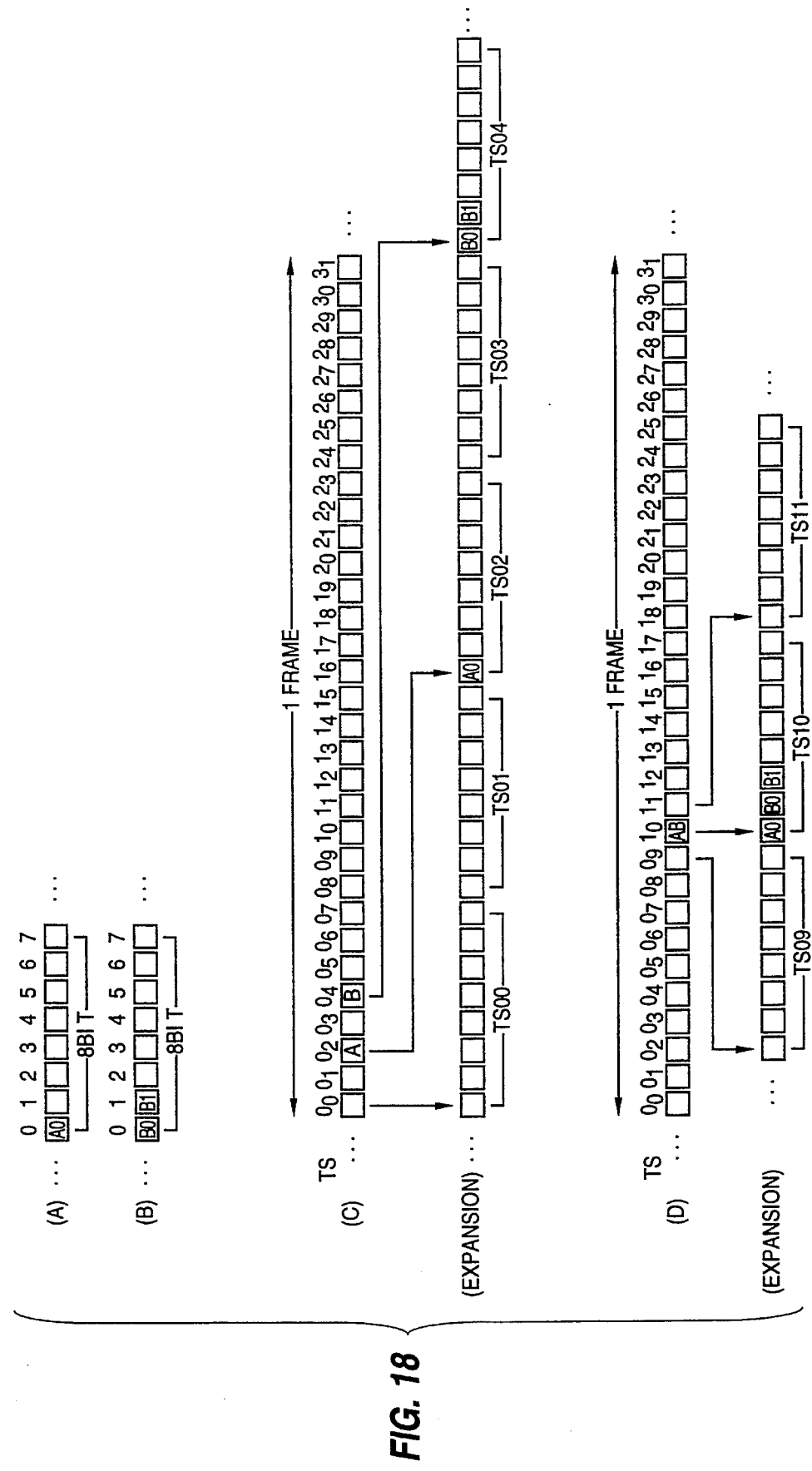
FIG. 18 illustrates a data input to SW③ shown in FIG. 17 (for input to a correspondent office)

FIG. 18 illustrates a data input to SW③ shown in FIG. 17 on input to a correspondent office. In FIG. 13, assuming that a terminal A has a communications speed of 2.4 kbps, only a significant datum A0 is in one [1] of eight [8] bits for 64 kbps in accordance with the CCITT v.110 format. Assuming that a terminal B has a communications speed of 9.6 kbps, only two [2] significant data B0 and B1 are in two [2] of eight [8] bits. It is assumed that, of data (C) inputted to SW③ . 23 from the exchange network 10, data from terminal A are stored in TS (time slot) 02 and data from terminal B are stored in TS04. If SW③ 23 multiplexes these significant data over TS 10, their output is (D).

When an ISDN transmission line is set, the position of a channel and the transmission speed (number of bits) of subrate control data are determined among corresponding terminals. Subrate data such as the number and the data transmission speed of a destination terminal, etc. are transmitted as a D channel signal in an ISDN among corresponding terminals.

Figure 19:
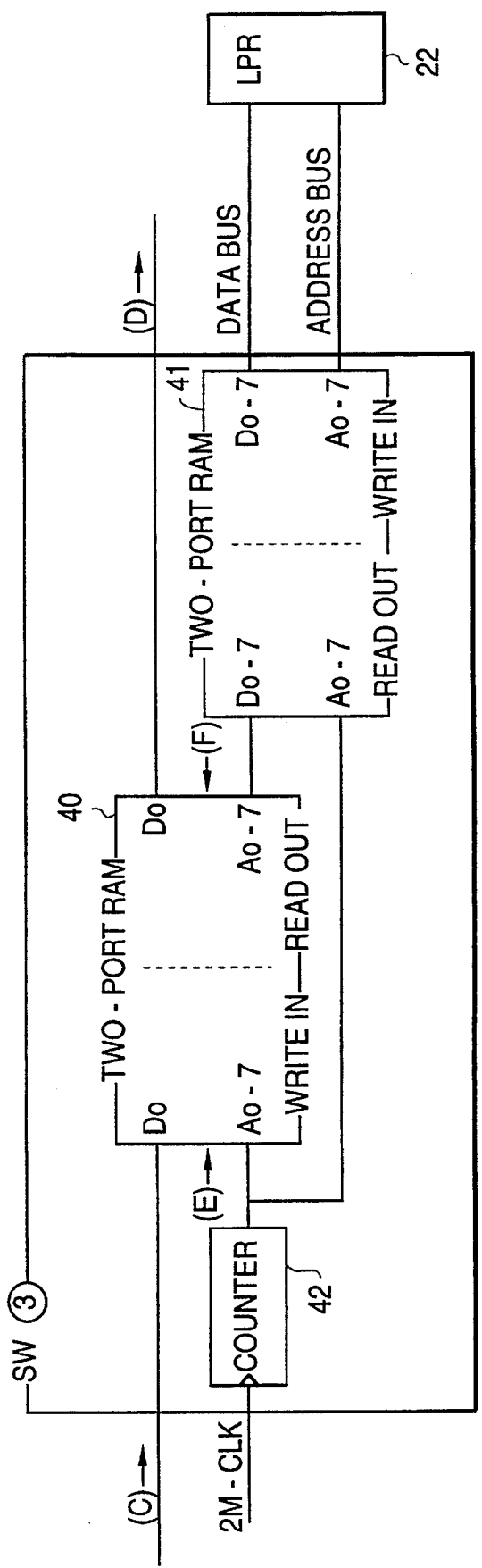
FIG. 19 illustrates a configuration embodying SW③ (for output to a correspondent office) shown in FIG. 17.

FIG. 19 illustrates a configuration of SW③. In FIG. 19, SW③ 23 comprises two [2] two-port RAMs (random access memories) 40 and 41 and a hexadecimal counter 42. Two-port RAM 40 receives an input (C), i.e. data B0 and B1 in TS04 and datum A0 in TS02. These data are read out in TS10 and outputted as (D). Two-port RAM 41 gives a readout address for two-port RAM 40. In FIG. 17, the subrate exchange trunk 11 has LPR 22 write data D0 through D7 corresponding to readout addresses into two-port RAM 41.

Figure 20:
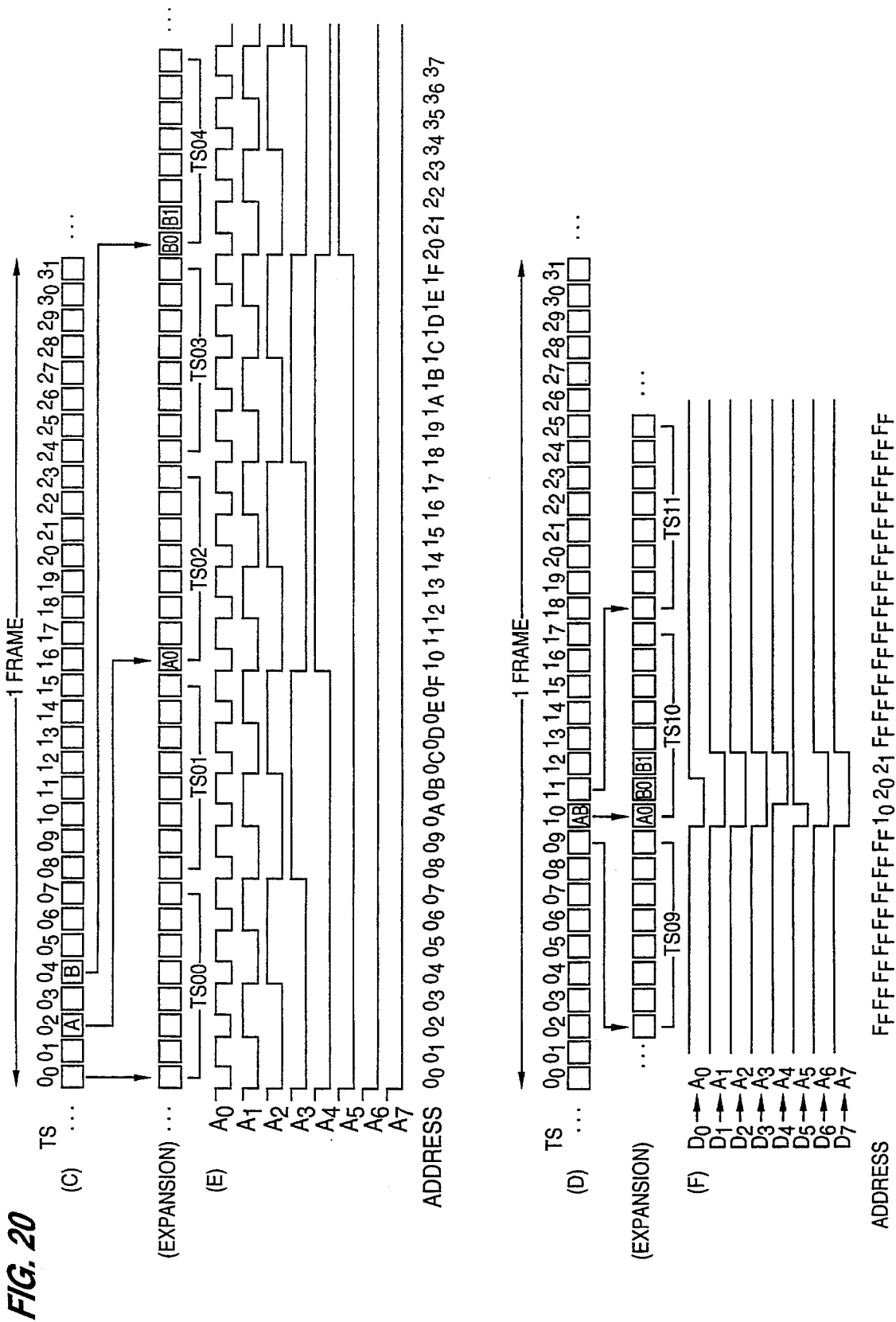
FIG. 20 illustrates operations of SW③ shown in FIG. 19.

FIG. 20 illustrates operations of SW③ shown in FIG. 19. In FIG. 20, input data for SW③ 23 are written into two-port RAM 40 according to an address given by an output (E) from hexadecimal counter 42. The written data are outputted as (D) in TS10. During this time, two-port RAM 41 gives an output (F) as a readout address for two-port RAM 40, and data are outputted according to the readout address. Hexadecimal counter 42 outputs a readout address for two-port RAM 41.

Since the two-port RAM 40 cannot simultaneously write and read data for the same address, the RAM is actually controlled to be segmented as, for example, four phases. The four phases are discriminated against one another with higher order one or two bits of an address 0XXh, 1XXh, 2XXh, and 3XXh. Assuming that the address being sequentially written is "0XXh", access to the same address can be prevented by determining that the address being read is 2XXh. Each time a sequential write to one phase is completed, a write address is shifted sequentially to 1XXh, 2XXh, and 3XXh, and simultaneously a read address is shifted sequentially to 3XXh, 0XXh, and 1XXh. The identical control is also performed on the two-port RAM 41.

Figure 21:
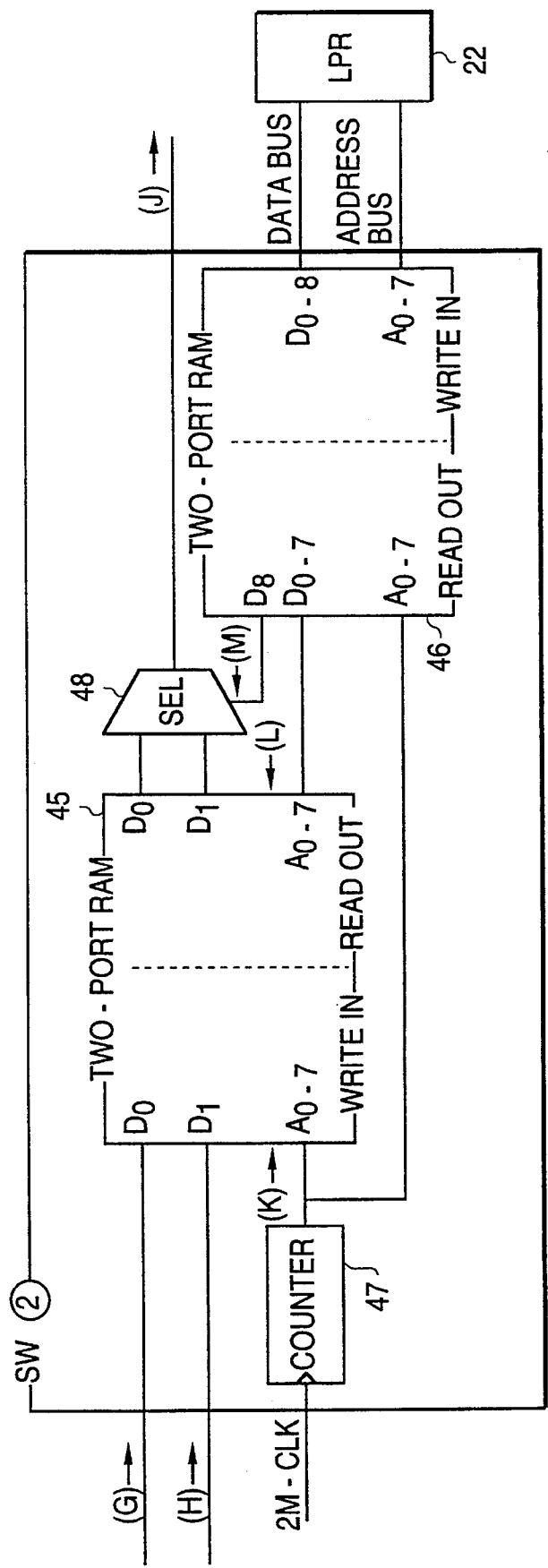
FIG. 21 illustrates a configuration embodying SW② (for output to a correspondent office) shown in FIG. 17.

The ISDN transmission line trunk 12 has its SW② 27 receive an output from the subrate exchange trunk 11, i.e.

output (D). FIG. 21 is a block diagram of SW② 27 for output to a correspondent office. In FIG. 21, SW② 27 comprises two [2] two-port RAMs (random access memories) 45 and 46, a hexadecimal counter 47 and a selector 48. The operations of two-port RAMs 45 and 46 and hexadecimal counter 47 are pari passu those of two-port RAMs 40 and 41 and hexadecimal counter 42 shown in FIG. 19. The selector 48 selects either B' channel data inputted from the subrate exchange trunk 11 (shown in FIG. 8), i.e. (G), or D' channel data inputted from a D' channel terminator 26, i.e. (H), and outputs its selection as (J) to SW① 28. As well, the ISDN transmission line trunk 12 has LPR 25 store data for two-port RAM 46. The selector 48 selects B' channel data (G) if $D_8$ inputted as (M) indicates the L level, while it selects D' channel data (H) if it indicates the H level.

Figure 22:
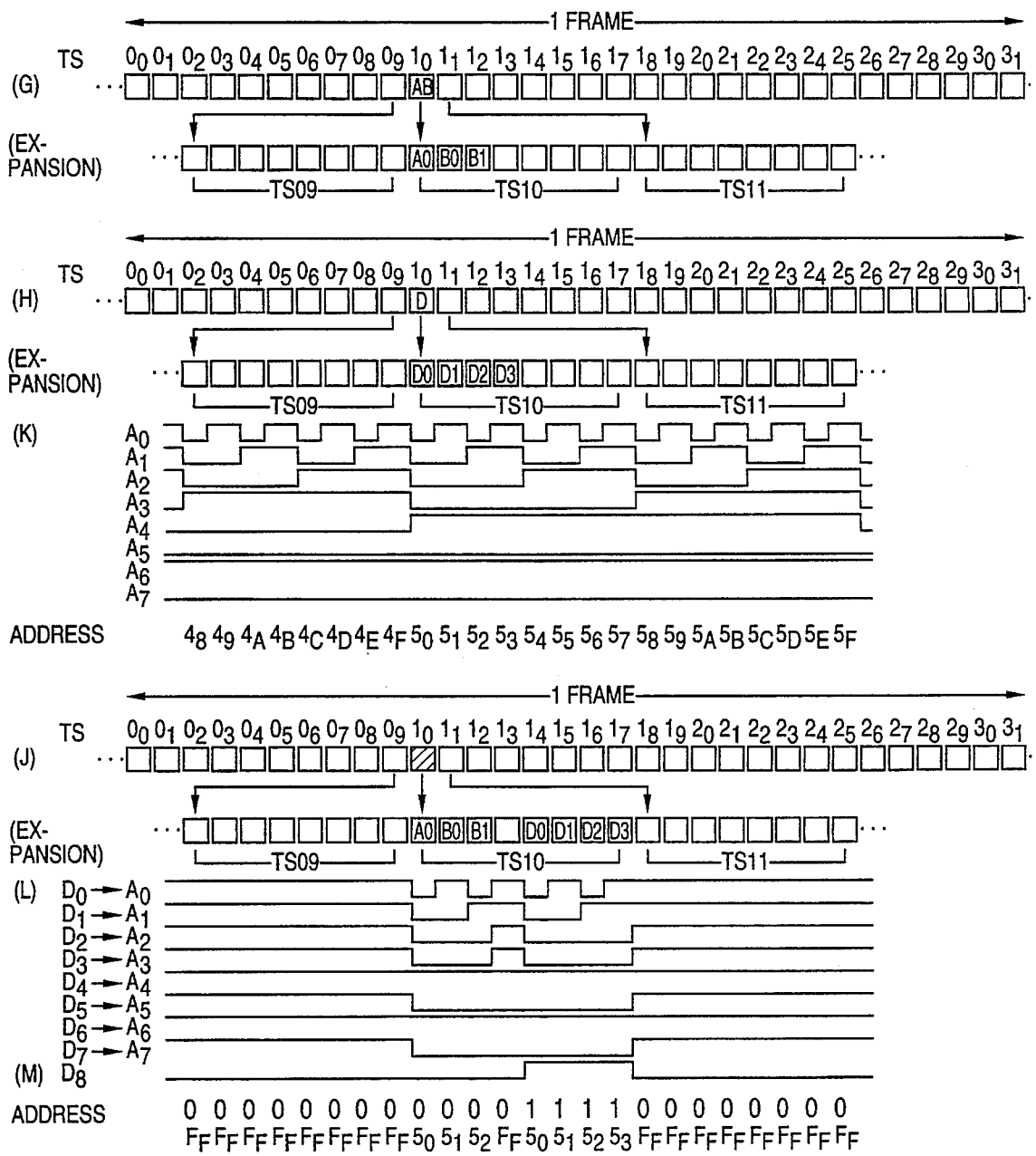
FIG. 22 illustrates operations of SW② shown in FIG. 21.

FIG. 22 illustrates operations of SW② shown in FIG. 21. In FIG. 22, B' channel data are stored in the first three [3] bits in TS10 shown as (G). Two-port RAM 45 shown in FIG. 21 has a data input terminal D0 write these significant data according to a write-in address outputted from hexadecimal counter 47. Meanwhile, the first four [4] bits of TS10 also store D' channel data (H) from the D' channel terminator 26. Two-port RAM 45 has a data input terminal D1 write these significant data according to the write-in address outputted from hexadecimal counter 47.

On output of data from two-port RAM 45, two-port RAM 46 supplies its outputs D0 through D7 as readout address (L) and a datum D0 as a signal switch control signal for selector 48. Accordingly, B' channel data in bits 1, 2 and 3 in TS10 and D channel data in bits 5, 6, 7 and 8 are outputted as output (J) to SW① 28.

Figure 23:
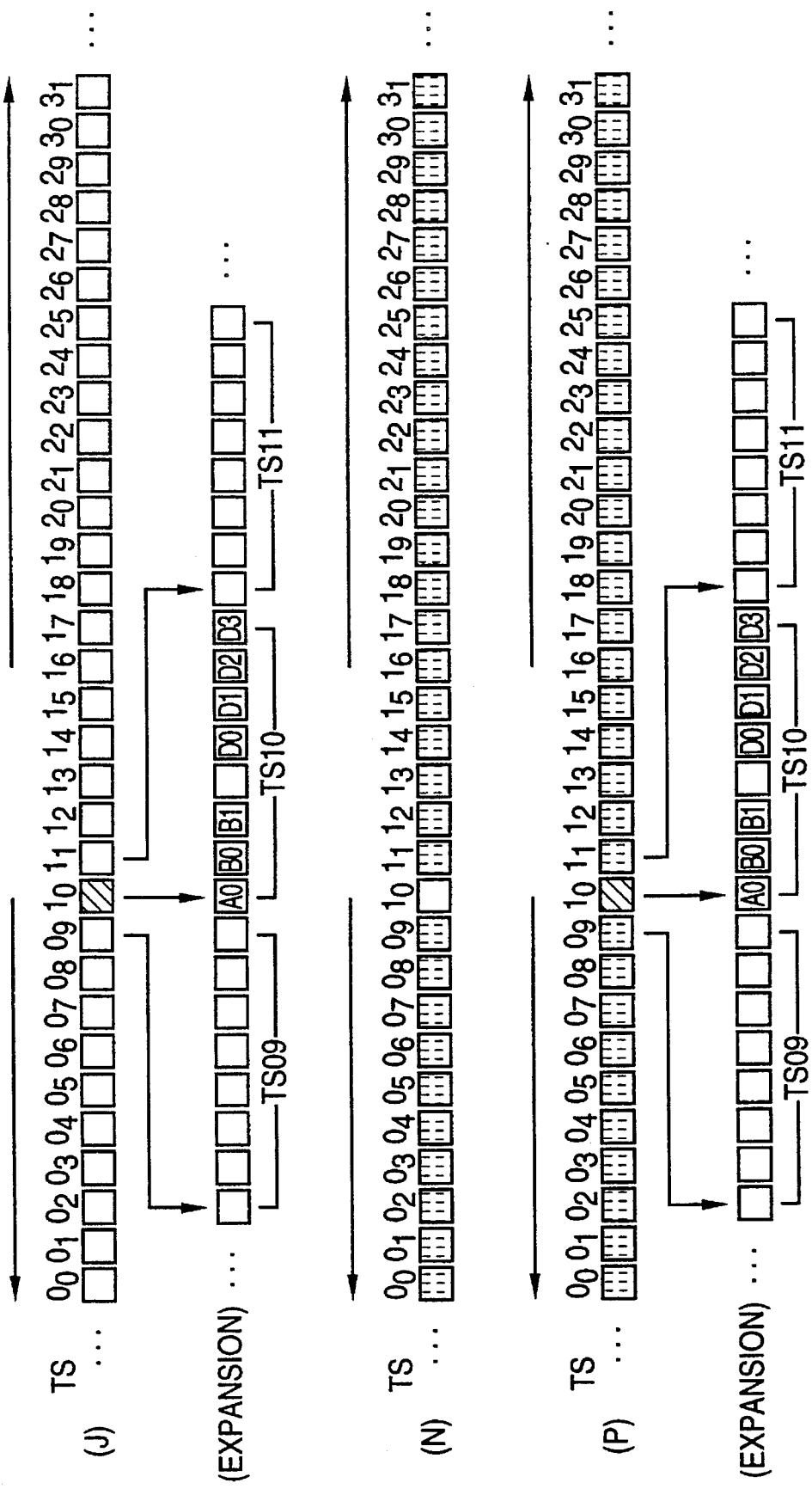
FIG. 23 illustrates operations of SW① shown in FIG. 17 (for output to a correspondent office)

FIG. 23 illustrates operations of SW① 28 shown in FIG. 17 on output to a correspondent office. SW① 28 multiplexes B channel data (N) e.g. voice data with B'+D' channel data (J) and outputs them as data (P) in a single frame. As in the case of output (P), SW① 28 stores B'+D' channel data in TS10 and B channel data in other time slots, such as TS9 and TS11. The descriptions for FIGS. 18 through 23, unlike that for FIG. 10, illustrate an example in which D'+B' channel data are stored in TS10 for an output to the terminating office, which correspond to a case e.g. in which transmission paths have a 10B+D format, as described later.

Figure 24:
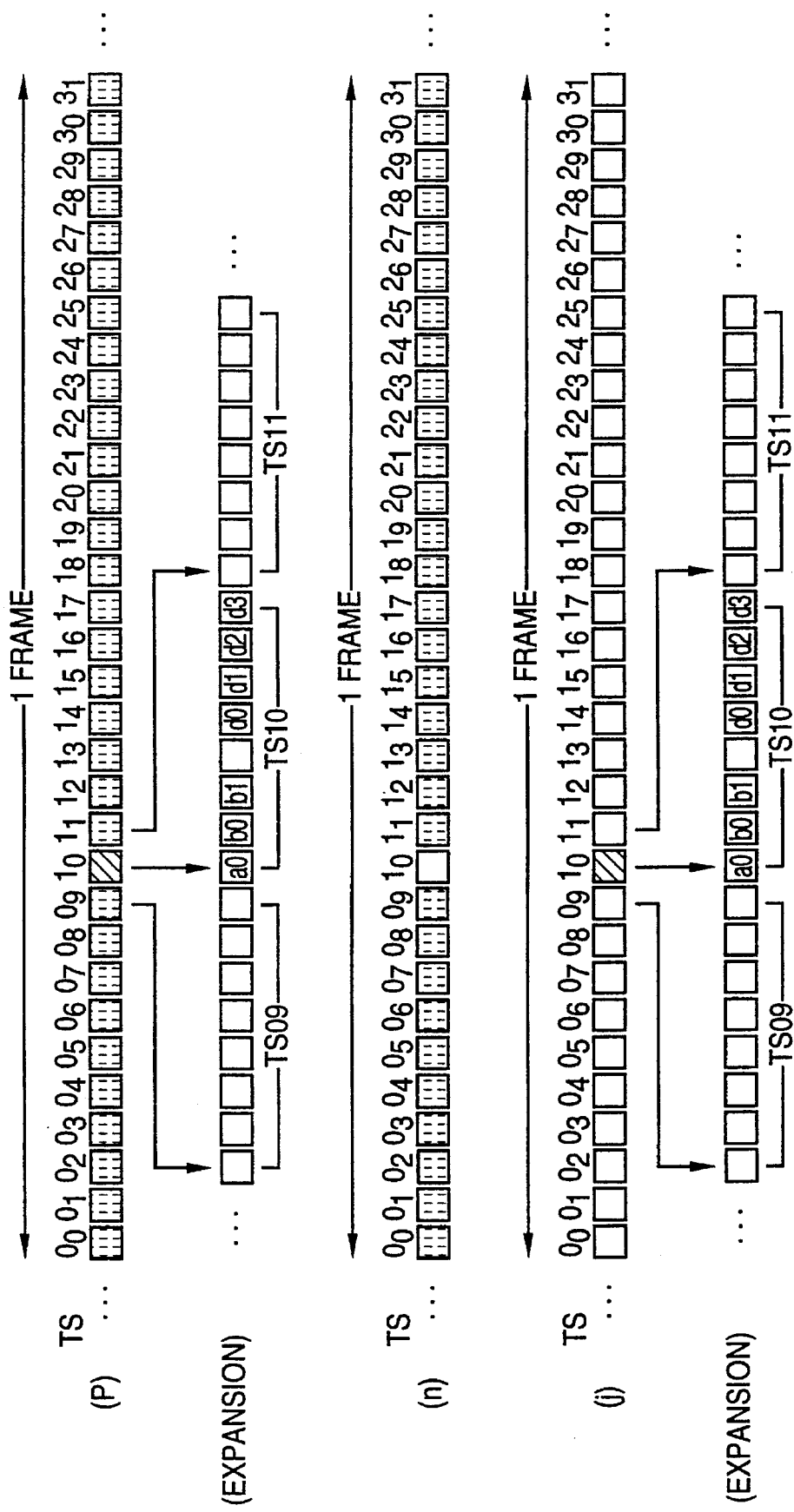
FIG. 24 illustrates the operations of SW① (for input from a correspondent office) shown in FIG. 17.

The flow of data inputted from an originating office is further explained. FIG. 24 illustrates the operations of SW① 28 shown in FIG. 17 on input from a correspondent office. In FIG. 24, input data (p) in TS10 contain B' channel data in bits 1, 2 and 3 and D channel data in bits 5 through 8. SW① 28 demultiplexes B channel data (n) from these data and outputs the rest as (j) to SW② 27.

A part of SW② 27 shown in FIG. 17 for outputting data to a correspondent office has a structure different than its part for inputting data from a correspondent office.

Figure 25:
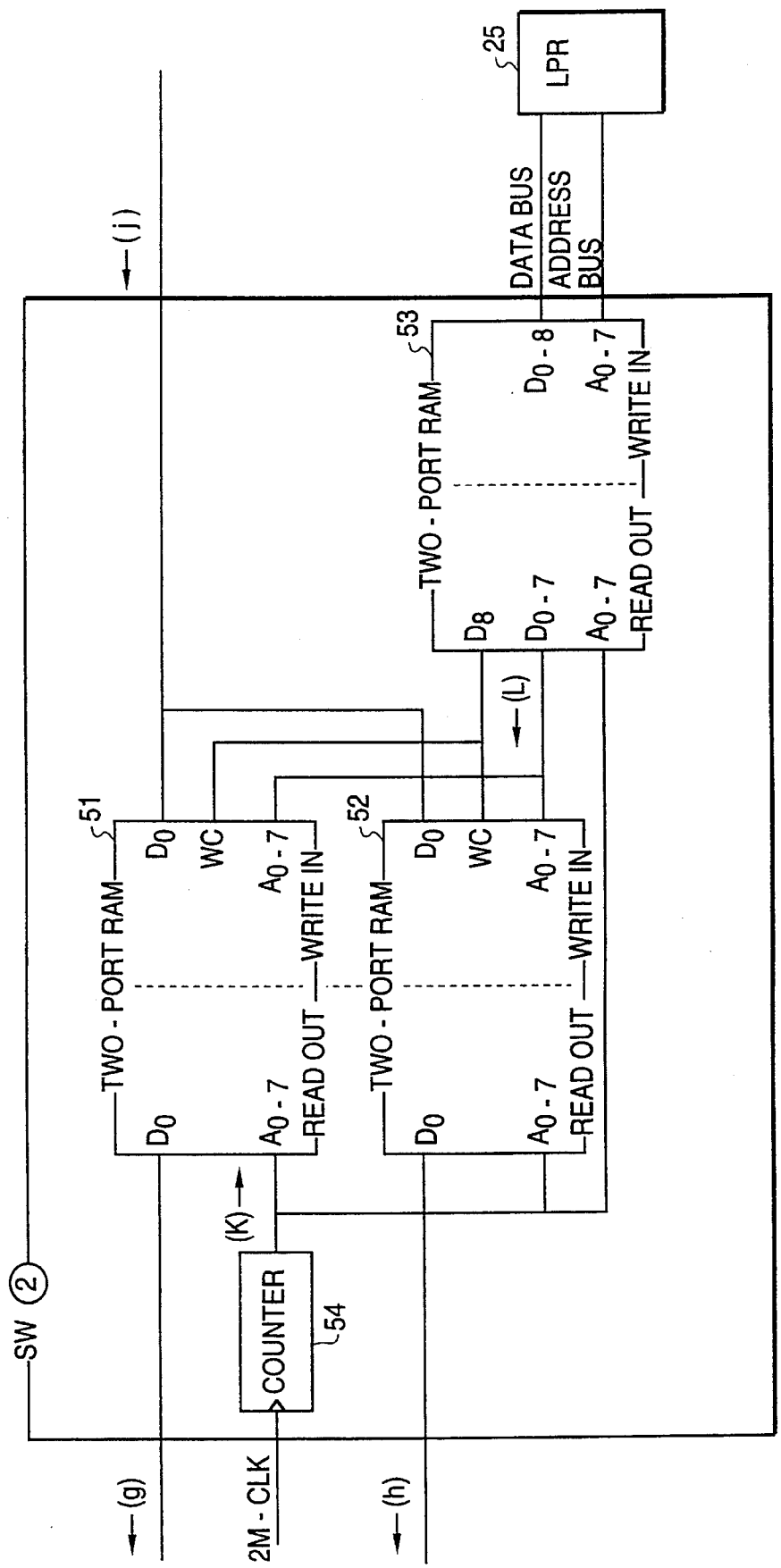
FIG. 25 is a block diagram showing a configuration embodying SW② (for input from a correspondent office) shown in FIG. 17.

FIG. 25 is a block diagram showing a configuration embodying SW② for input from a correspondent office. This is in contrast with FIG. 21 showing a configuration embodying SW② for output to a correspondent office. In FIG. 25, SW② 27 comprises three [3] two-port RAMs 51, 52 and 53 and a hexadecimal counter 54. Two-port RAM 51 outputs B' channel data (g) to the subrate exchange trunk 11, two-port RAM 52 outputs D' channel data (h) to the D' channel terminator 26, and two-port RAM 53 outputs write-in addresses for two-port RAMs 51 and 52.

Figure 26:
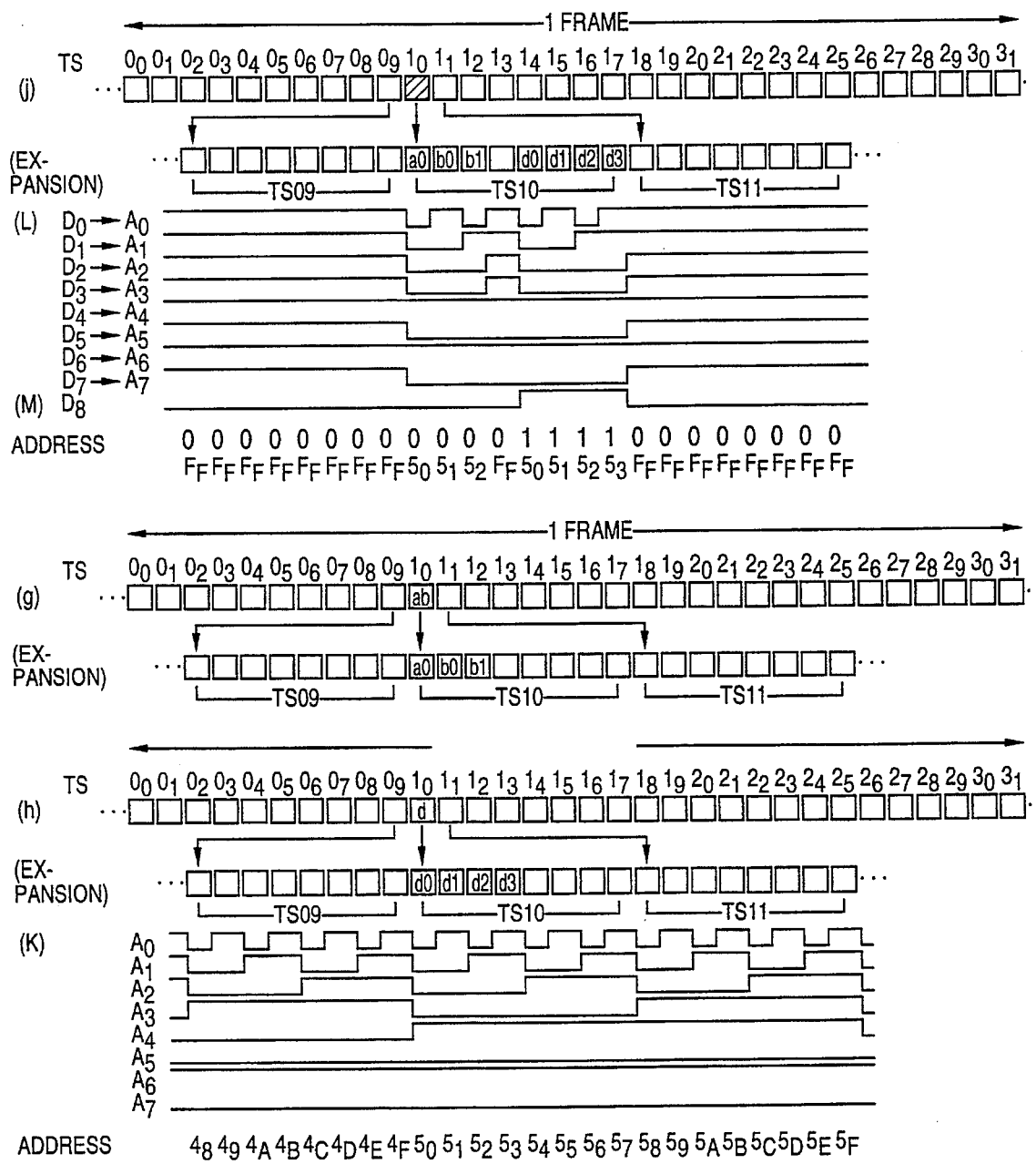
FIG. 26 illustrates operations of SW② shown in FIG. 25.

FIG. 26 illustrates operations of SW② shown in FIG. 25. In FIG. 26, data (j) inputted from SW① 28 are written in accordance with the write-in addresses specified by outputs D0 through D7 from two-port RAM 53 shown in FIG. 25.

A data output D8 (M) from two-port RAM 53 determines into which one of two-port RAMs 51 and 52 data are written. Data written into two-port RAMs 51 and 52 are outputted as (g) and. (h) in accordance with readout addresses given by an output (K) from hexadecimal counter 54.

Figure 27:
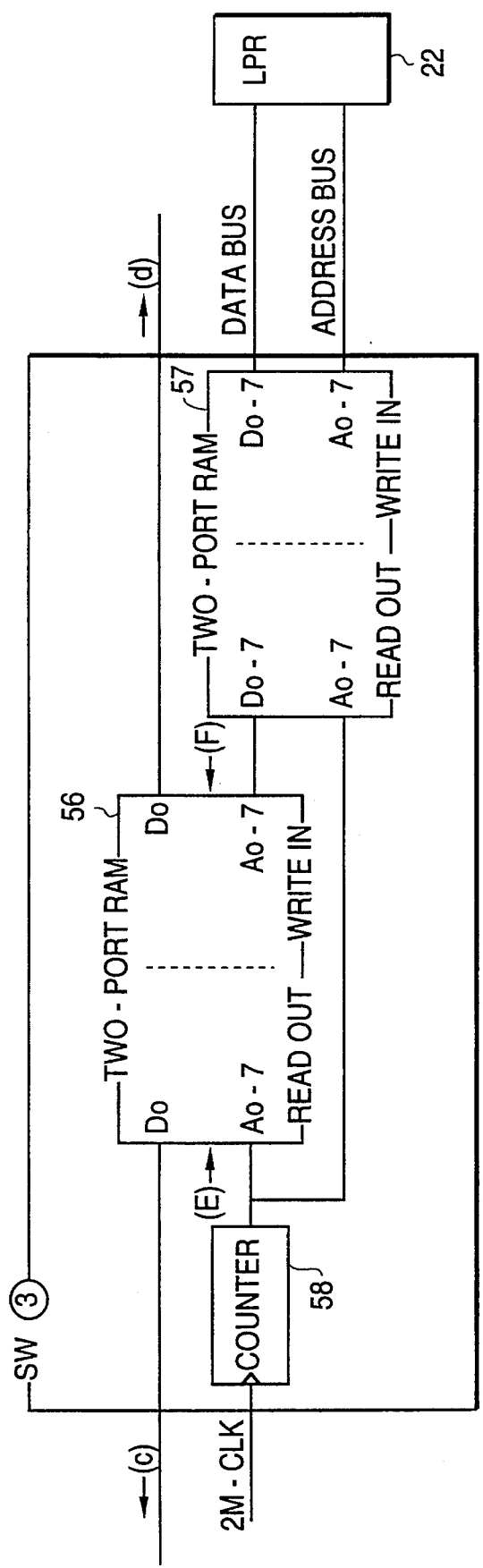
FIG. 27 illustrates the configuration of an embodiment of SW③ (for input from a correspondent office) shown in FIG. 17.

FIG. 27 illustrates the configuration of an embodiment of SW③ 23 (for input from a correspondent office) shown in FIG. 17. It shows essentially the same configuration as FIG. 19, except that data directions are different.

Figure 28:
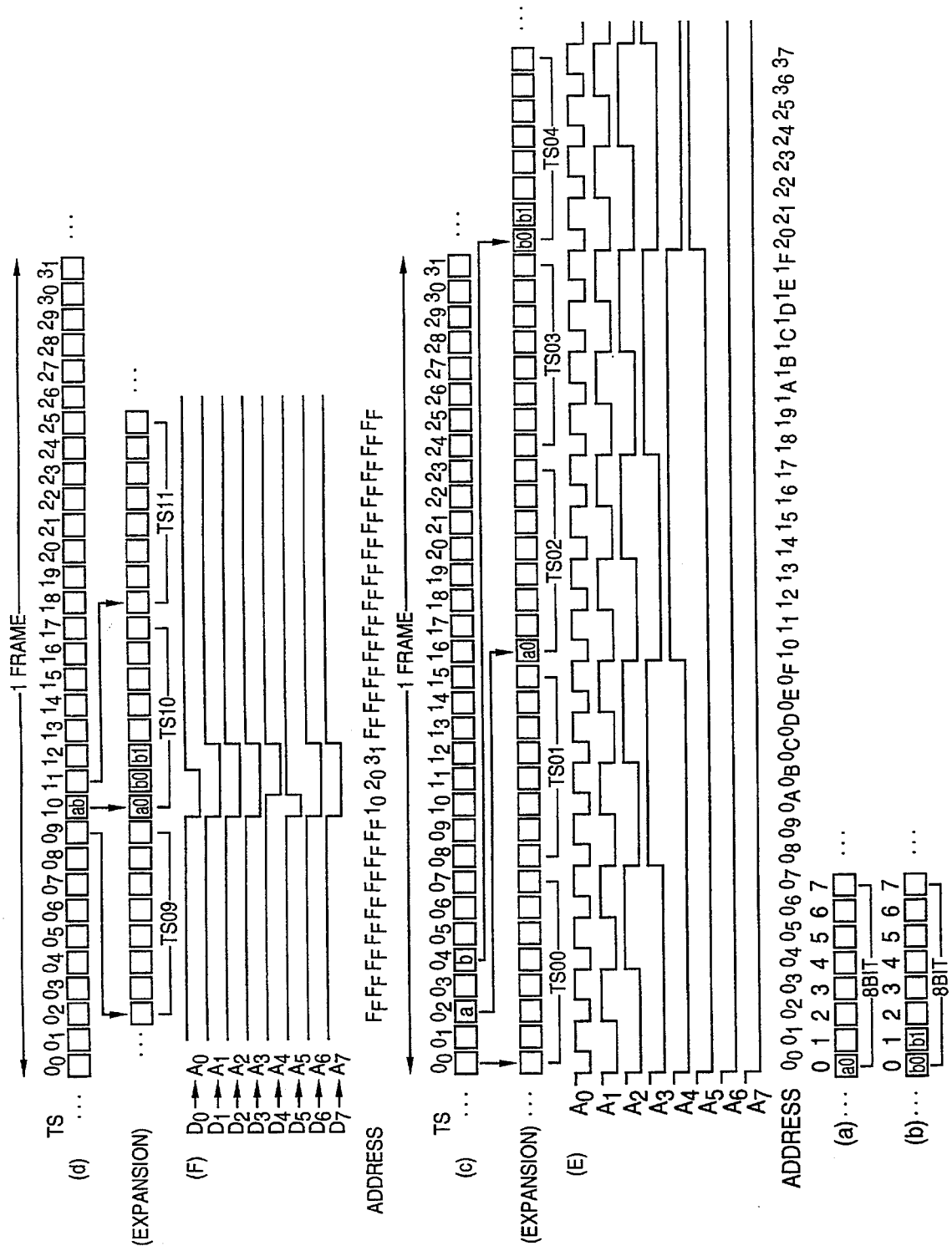
FIG. 28 illustrates operations of SW③ shown in FIG. 27.

FIG. 28 illustrates operations of SW③ shown in FIG. 27. FIG. 28 is not explained in detail, because FIG. 28 shows operations exactly opposite to those shown in FIGS. 18 and 20 for output of data to a correspondent office.

Figure 29:
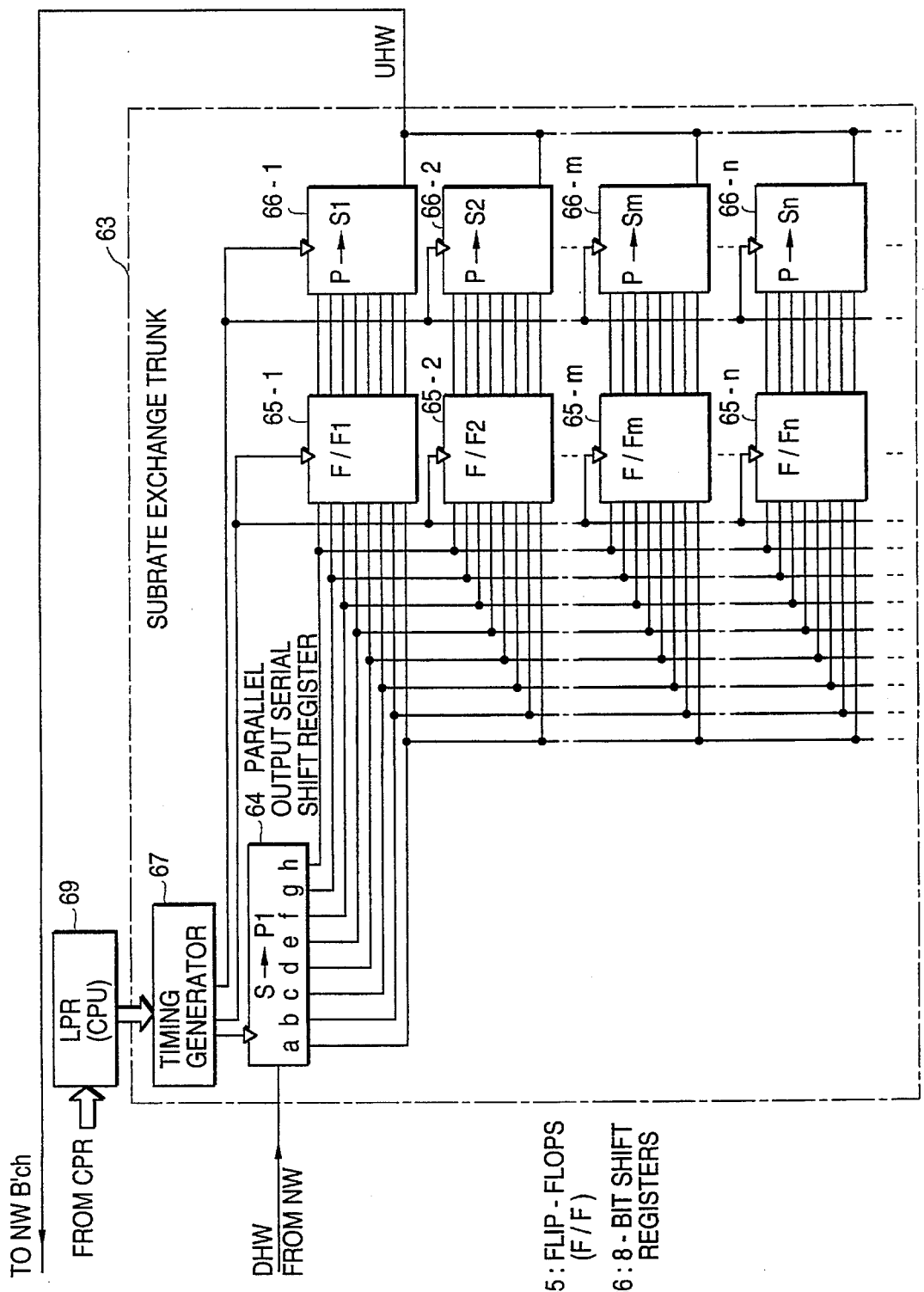
FIG. 29 is a block diagram illustrating another configuration embodying a subrate exchange trunk.

The above description assumes that the subrate exchange trunk 11 (shown in FIG. 8 e.g. for the first embodiment) has SW③ 23 combine data from low speed terminals into a single time slot. But it is also possible to configure the subrate exchange trunk 11 in a different manner. FIG. 29 is a block diagram illustrating another configuration embodying a subrate exchange trunk.

In this case, a subrate exchange trunk includes demultiplexing only significant data from data inputted from plural low speed data terminals connected through an exchange network and multiplexing these significant data over a time slot for a single channel in eight [8] bits for their transmission to a correspondent office. The correspondent office demultiplexes the multiplexed 8-bit data containing only significant data in bit units for low speed data terminals.

The system in this case notifies the correspondent office of data on low speed data terminals, e.g. data on communications speed and bit positions at which data are multiplexed, according to a shared line signal system e.g. of a D channel. These data enable the subrate exchange trunk to multiplex and demultiplex communications data exchanged among low speed data terminals.

The configuration of this subrate exchange trunk is explained in further detail with reference to FIG. 29. A subrate exchange trunk 63 comprises a parallel output serial shift register 64, a plurality of flip-flops (latch circuits) 65-1 through 65-n, a plurality of 8-bit shift registers 66-1 through 66-n and a timing generator 67.

The parallel output serial shift register 64 outputs serial data from low speed data terminals after converting them into parallel data a through h. The flip-flops 65-1 through 65-n latch 8-bit parallel outputs from the parallel output serial shift register 64. The 8-bit shift registers 66-1 through 66-n receive outputs from the flip-flops 65-1 through 65-n, respectively. The timing generator 67 generates and supplies timing clocks TC1 through TC6 necessary for the parallel output serial shift register 64, the flip-flops 65-1 though 65-n and the 8-bit shift register 66-1 through 66-n, based upon data from a line processor 69.

Figure 30:
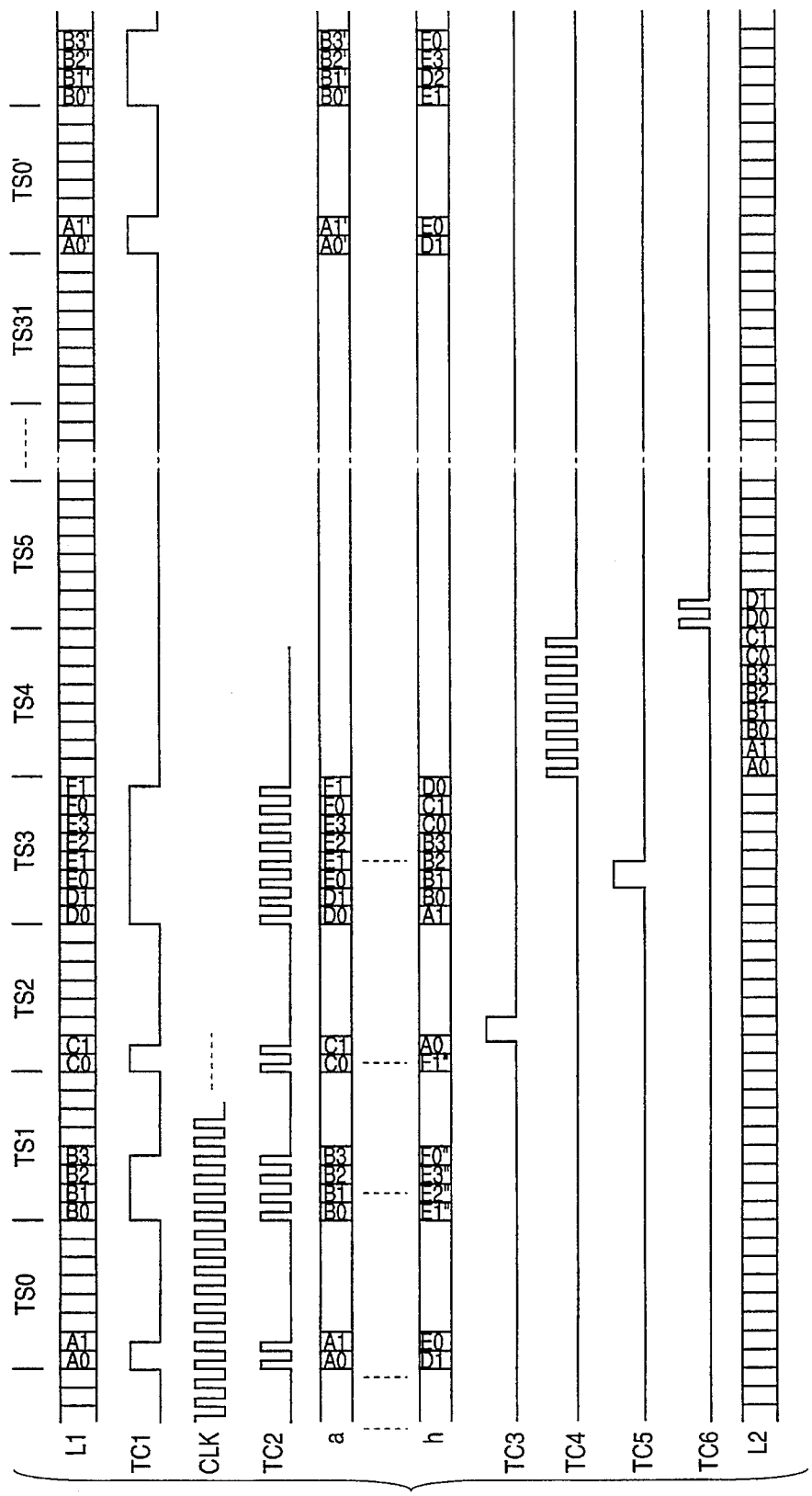
FIG. 30 is a timing chart illustrating operations of the subrate exchange trunk shown in FIG. 29.

FIG. 30 is a timing chart illustrating operations of the subrate exchange trunk 63 shown in FIG. 29.

In this embodiment, 8-bit data in thirty-two [32] time slots, i.e. 256-bit serial data, comprising data from respective low sped data terminals inputted via a down highway (DHW) for a time-divisional digital exchange and multiplexed data from a correspondent office are sequentially written into the parallel output serial shift register 64.

Explained below as an example is a procedure for compressing and multiplexing over TS4 data (A0 and A1) in TS0, (B0, B1, B2 and B3) in TS1 and (C0 and C1) in TS2 in a data column L1 comprising thirty-two [32] time slots received from a down highway (DHW) for an output to an up highway (UHW).

A call processor (CPR, not shown) notifies the line processor (LPR) 69 of the position of a time slot in which data to be compressed in data column L1 exist and the position of a time slot in which parts of data to be compressed exist. The line processor (LPR) 69 sets in the timing generator 67 the parts of data to be compressed and the positions of time slots of data to be compressed. The timing generator 67 generates timing clocks TC1, TC3 and TC4. TC1 indicates the positions of data to be compressed. TC3 indicates the timing at which accumulated eight [8] bits of data are latched at a flip-flop. TC4 indicates a timing at which accumulated eight [8] bits of data are multiplexed in a time slot TS4.

The timing generator 67 generates a timing clock TC2 (timing for a data transfer) as a conjunction of a timing clock TC1 and the master clock CLK of an exchange. Timing clock TC2 activates the parallel output serial shift register (S→P1)64. After having e.g. flip-flop 65-m (F/F-m) latch 8-bit parallel data output a through h at timing clock TC3, 8-bit shift register 66-m (P→S-m) outputs the latched 8-bit data over to an up highway (UHW) at timing clock TC4.

Thus, data (A0, A1, B0, B1, B2, B3, C0 and C1) have been compressed in time slot TS4.

The reason why FIG. 29 shows the flip-flops 65 and the 8-bit shift registers 66 is because n units can handle a large amount of data to be compressed. For instance, when TS0 through TS11 have two [2] bits each of data to be compressed and these twenty-four [24] bits of data need to be outputted in TS28, TS30 and TS31, three [3] each of the flip-flops 65 and the 8-bit shift registers 66 are required.

Explained next is a procedure for demultiplexing (expanding) data in a subrate exchange. Described below as an example is a procedure for expanding in time slot TS5 data (D0 and D1) of data (D0, D1, 00, E1, E2, E3, F0 and F1) in TS3 in data column L1 of thirty-two [32] time slots received from a down highway, for an output to an up highway (UHW).

A call processor (CPR, not shown) notifies the line processor (LPR) 69 of the position of a time slot in data column L1 in which data to be expanded exist and the position of a time slot in which data are to be expanded. The line processor (LPR) 69 sets in the timing generator 67 the parts of data to be expanded and the position of a time slot at which data are expanded. The timing generator 67 generates timing clocks TC1, TC5 and TC6. TC1 indicates the position of a time slot where data are expanded. TC5 indicates the timing at which a flip-flop latches eight [8] bits of data. TC6 indicates a timing at which eight [8] bits of data in a time slot (the output position for D0 and C1, in this example) are demultiplexed.

The timing generator 67 generates a timing clock TC2 (timing for a data transfer) as a conjunction of a timing clock TC1 and an original clock CLK in an exchange. Timing clock TC2 activates the parallel output serial shift register (S→P) 64. After having e.g. flip-flop 65-n (F/Fn), different to flip-flop 65-m (F/F-m) used earlier, latch 8-bit parallel data output a through h at timing clock TC5, 8-bit shift register 66-n (P→Sn) outputs the latched 8-bit data over to an up highway (UHW) at timing clock TC6.

Thus, data (D0 and D1) have been expanded in time slot TS5. Thereafter, data (E0, E1, E2 and E3) and (F0 and F1) are similarly expanded.

Figure 1:
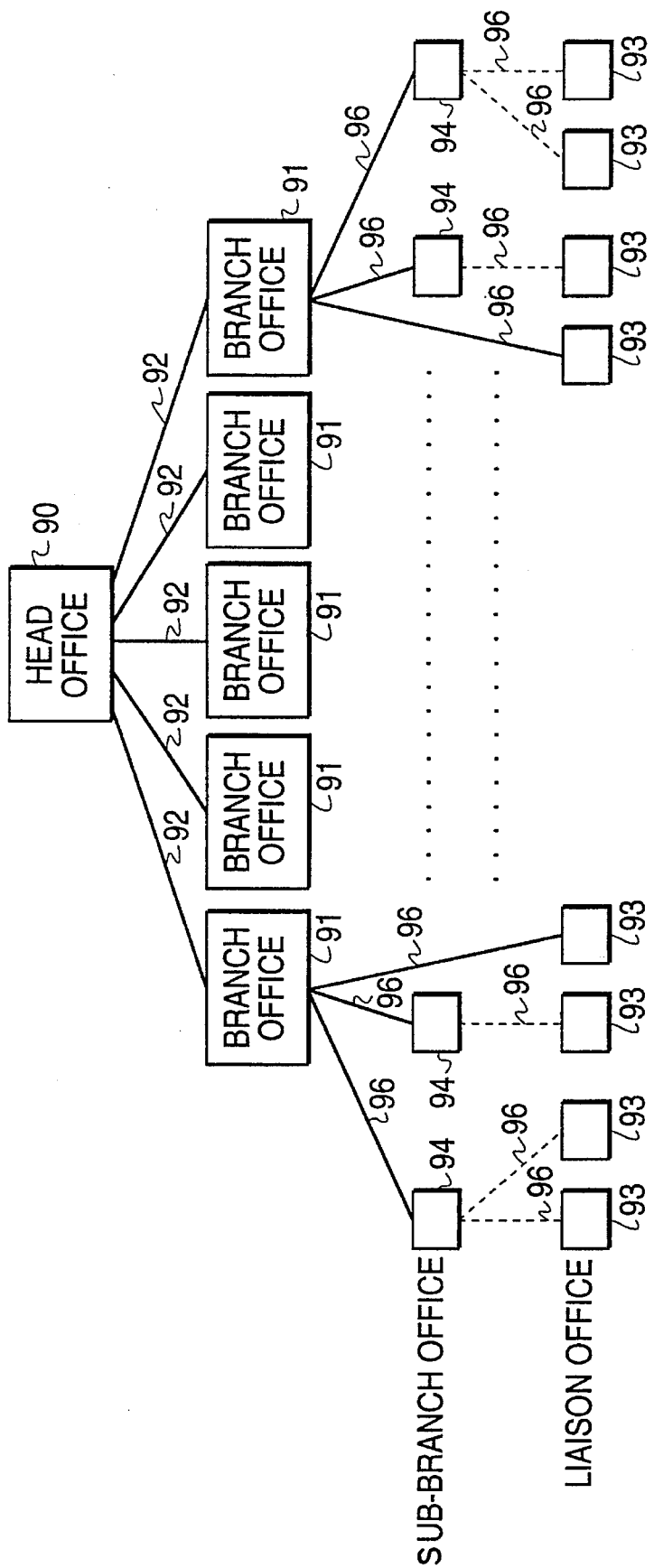
FIG. 1 shows an exemplary configuration of an intracorporate communications network.
Figure 2:
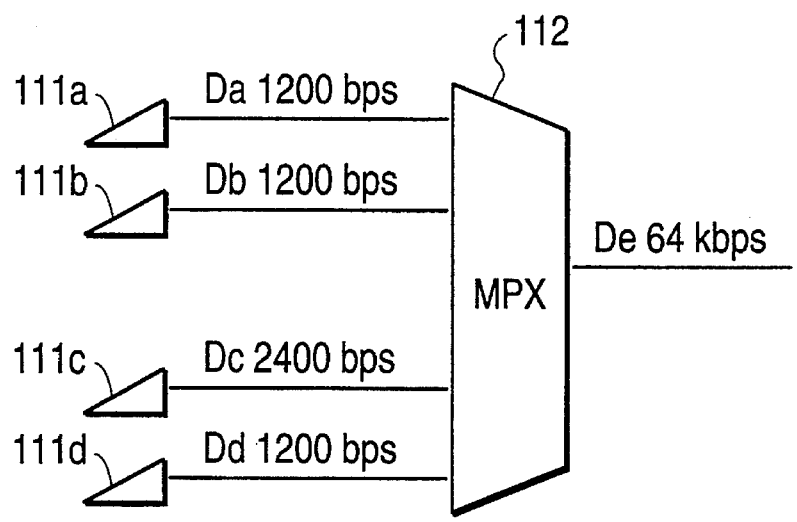
FIG. 2 shows a prior art of multiplexing for use in a conventional exchange system.
Figure 3:
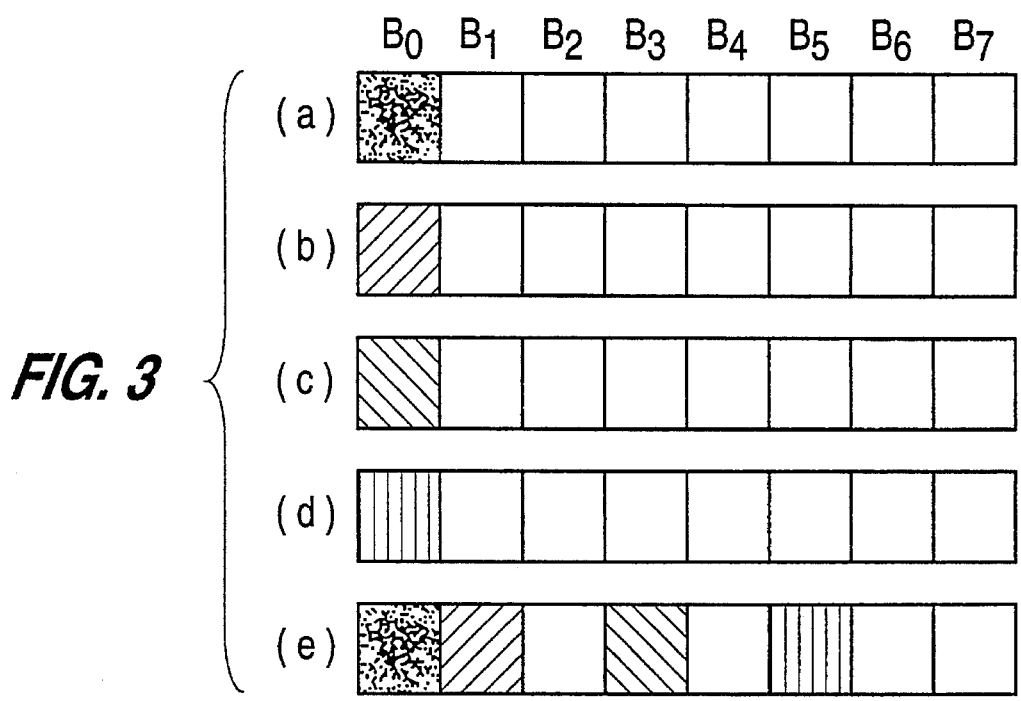
FIG. 3 shows an example of the bit structures of respective channels for use in a conventional exchange system.
Figure 4:
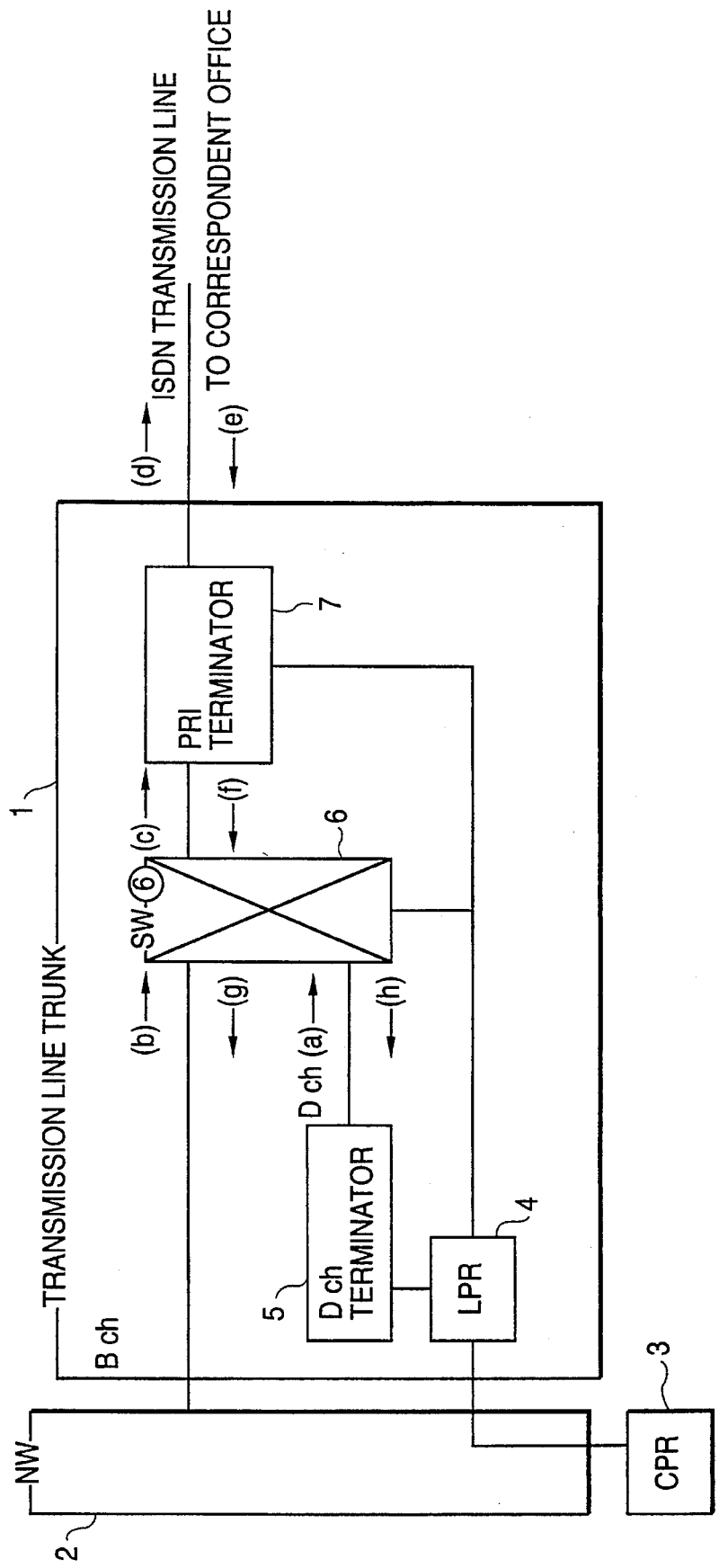
FIG. 4 is a block diagram showing the configuration of a conventional ISDN transmission line trunk.
Figure 5:
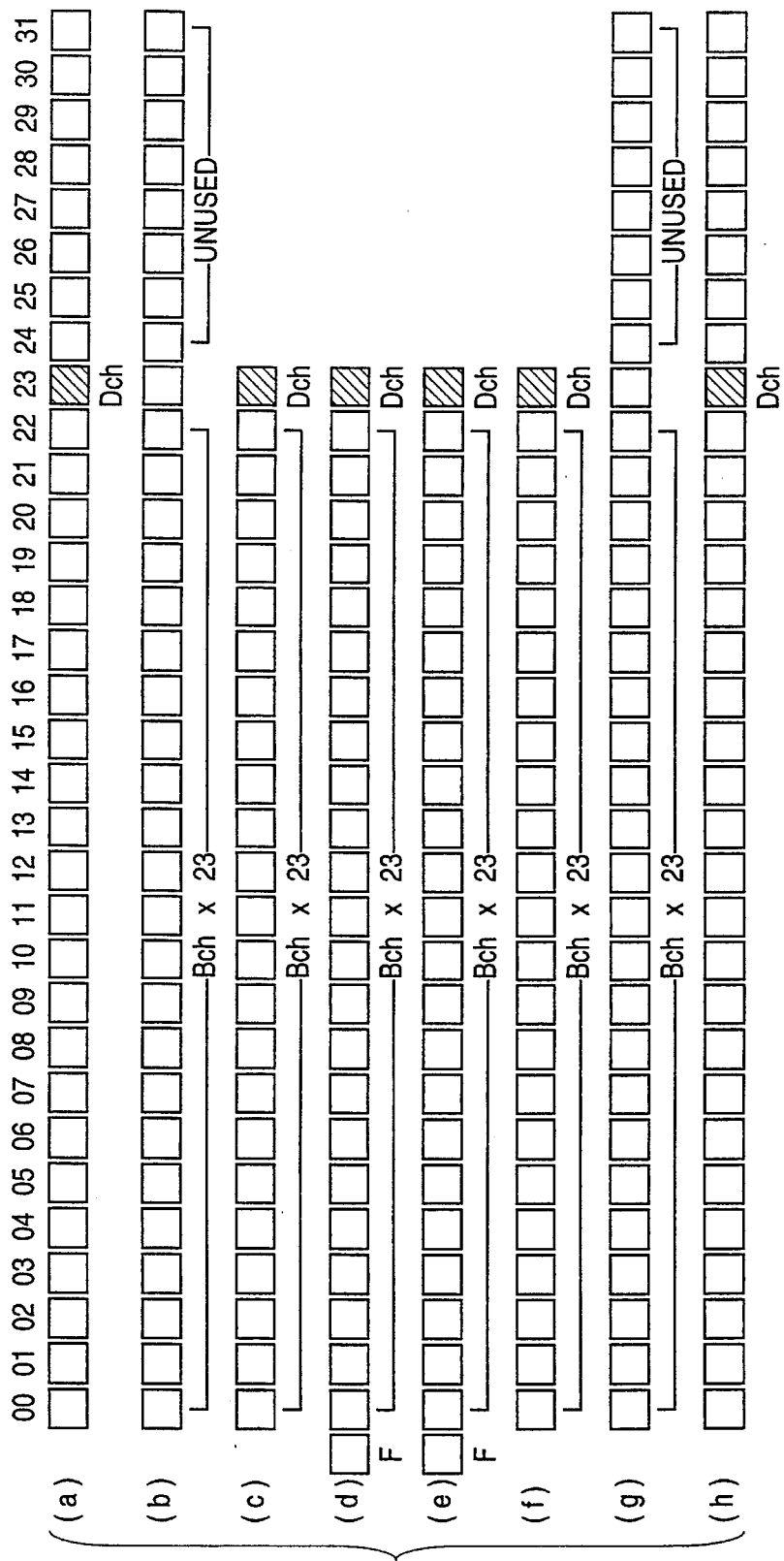
FIG. 5 illustrates the signals flowing in FIG. 4.

The basic arrangement in the above description, except for the examples shown in FIGS. 18 through 28, assumes that line numbers are twenty-four [24] channels and transmission paths are in a 23B+D frame form. However, an intracorporate network such as one shown in FIG. 1 uses various forms of transmission paths such as 5B+D and 7B+D. Accordingly, explained next is an application of a subrate control channel exchange system of this invention for a case in which such various transmission paths are used in combination.

Figure 31:
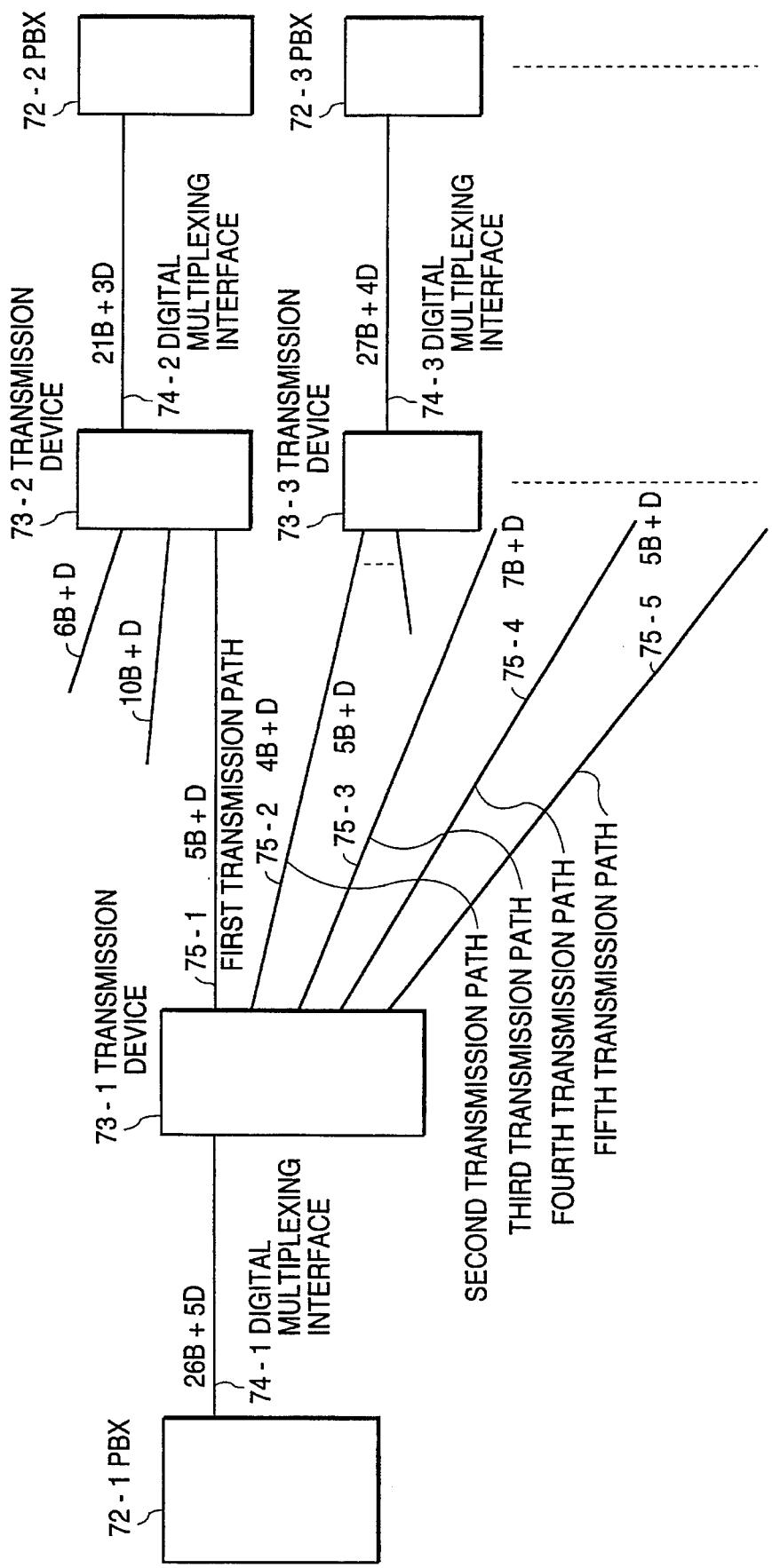
FIG. 31 is a block diagram showing a configuration of a communications system using a variety of transmission paths.

FIG. 31 is a block diagram showing a configuration of a communications system using a variety of transmission paths. In FIG. 31, a digital multiplex interface 74-1 transmits to a transmission device 73-1 data from a private branch exchange (PBX) 72-1 accommodating a plurality of terminals(not shown). The transmission device 73-1 transmits communications data to a transmission device 73-2 via a 5B+D first transmission path 75-1 and to a transmission device 73-3 via a 4B+D second transmission path 75-2. Transmission devices 73-2 and 72-3 are connected respectively via PBX 72-2 and 73-3 to a plurality of low speed terminals (not shown).

In FIG. 8, because transmission device 73-1 is connected to other transmission devices via five [5] transmission paths, digital multiplex interface 74-1 between PBX 72-1 and transmission device 73-1 must have an m B+n D form arbitrarily, such as one culminating in a 26B+SD form.

Figure 32:
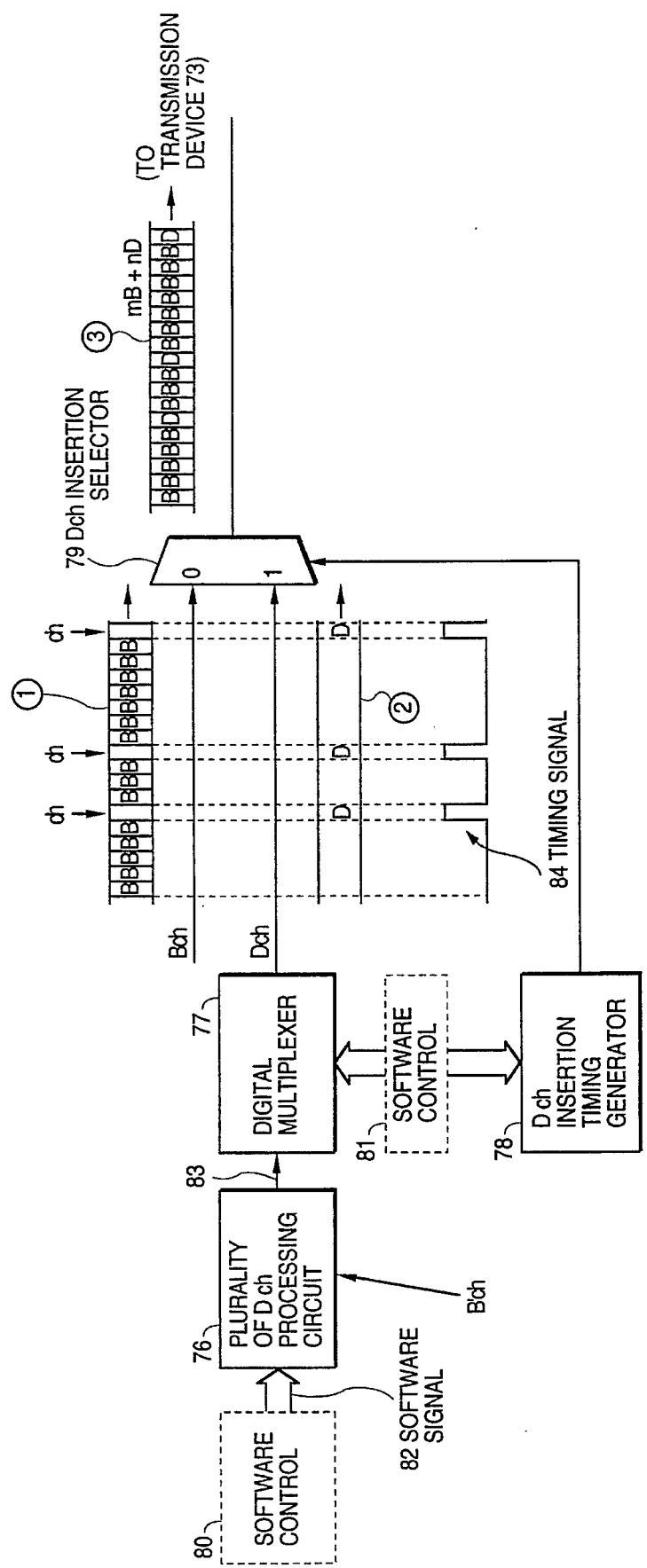
FIG. 32 is a block diagram illustrating a basic configuration of an ISDN transmission line trunk (on the originating side) corresponding to FIG. 31.

For this reason, it is necessary to have the ISDN transmission line trunk 12 provided in PBX 72-1 output a frame in an m B+n D form to an ISDN transmission line. FIG. 32 is a block diagram illustrating a basic configuration of an ISDN transmission line trunk (on the originating side) corresponding to FIG. 31.

In an ISDN, a plurality of terminals (not shown) input to PBXs 72 (shown in FIG. 31) respective user data as a B channel signal Bch multiplexed over a time slot for a B channel in a form shown as ① in FIG. 32.

Meanwhile, a plurality of D channel processing circuits 76 receive a control signal 82, such as a call control signal generated in a PBX by a software processing of the originating side and build a frame signal 83 in a HDLC (High-level Data Link Control procedure) format. Here, by having the plurality of D channel processing circuits 76 receive a B' channel signal from the subrate exchange trunk 11 shown in FIG. 8, it becomes possible to multiplex B' channel data with control data at an appropriate position of an empty channel of a B channel signal inputted from a terminal. The plurality of D channel processing circuits 76 include switches capable of exchanging in bit units such as SW② 27 shown in FIG. 8.

A digital multiplexer 77 outputs the frame signal 83 as a D channel signal Dch shown as [2] in FIG. 32.

A D channel insertion selector 79 multiplexes the D channel signal Dch with the B channel signal Bch in a form shown as [1] in FIG. 32, and outputs a multiplexed signal in an m B+n D form shown as [3] in FIG. 32 from an appropriate one of the digital multiplexing interfaces 74 to the corresponding one of the transmission devices 73. (Refer to FIG. 31)

The D channel insertion selector 79 selects the D channel signal Dch from the digital multiplexer 77 at a timing when the timing signal 84 outputted from the D channel insertion timing generator 78 becomes active, and the B channel signal Bch at all other timings.

In the above configuration, a software control 81 controls operations of the digital multiplexer 77 and the D channel insertion timing generator 78.

Figure 33:
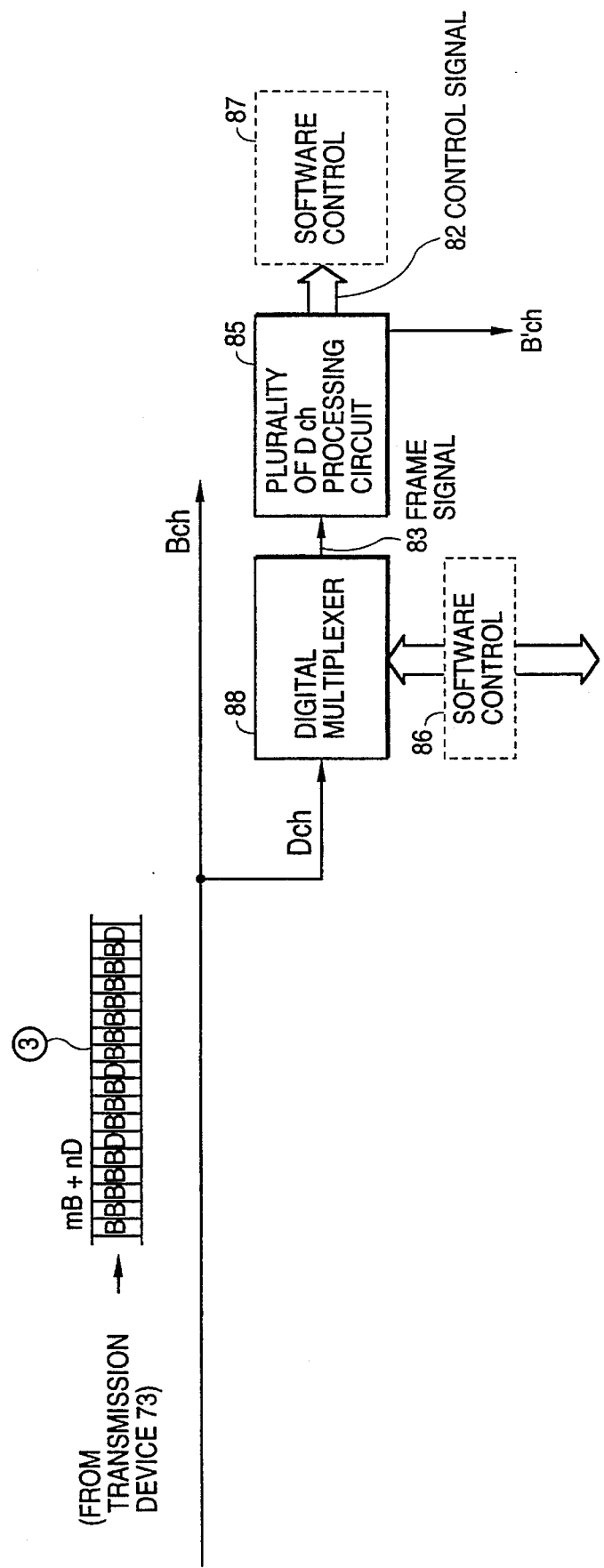
FIG. 33 is a block diagram illustrating a basic configuration of an ISDN transmission line trunk (on the terminating side) corresponding to FIG. 31.

FIG. 33 is a block diagram illustrating a basic configuration of an ISDN transmission line trunk (on the terminating side) corresponding to FIG. 31. An ISDN transmission line trunk on the terminating side demultiplexes a control signal received from an appropriate one of the digital multiplexing interfaces 74.

Of multiplexed signals inputted in an m B+n D form shown as ③ in FIG. 33, an appropriate one of the PBXs 72 transfers the B channel signal Bch to terminals(not shown).

Meanwhile, a digital demultiplexer 88 operating under control of a software control 86 demultiplexes the D channel signal Dch from B channel signal Bch, which is extracted as a frame signal 83.

An appropriate one of a plurality of Dch processing circuits 85 receive the frame signal 83 to be disassembled into a control signal 82 and a B' channel signal to be outputted to the subrate exchange trunk 11, in a processing reverse to that performed by the plurality of the D channel processing circuits 76 (shown in FIG. 32), into a control signal 82 and a B' channel signal to be outputted to the subrate exchange trunk 11.

A software control 87 on the terminating side processes the control signal 82 e.g. for a call control.

As described above in detail, this invention allows channels to be utilized efficiently by limiting a transmission speed to 32 kbps or 16 kbps, when an ISDN transmission line does not require 64 kbps in a D channel data transmission, for using the remaining bits in the time slots for a D channel to be used for a voice data transmission. This invention is applicable not only to a transmission system of 23B+D paths for use in a public network but also to conventional transmission systems e.g. of 5B+D and 7B+D paths.

What is claimed is:

1. A subrate control channel exchange system for use with an exchange device in a communications network for establishing communications by multiplexing communications data applied from a source terminal unit to a destination terminal unit over an exchange network together with communication control data, said exchange device comprising:

subrate switch trunk means for extracting only significant bits from low speed communications data applied from a plurality of low speed terminal units connected to said exchange network, multiplexing said significant bits in a time slot corresponding to a channel comprising a first predetermined number of bits in said communications network and outputting said multiplexed signal bits, and demultiplexing said significant bits in a reverse processing order; and bit unit exchange switching means for multiplexing an output of said subrate switch trunk means with said communication control data, said communication control data being a number of bits such that the number of bits of said communication control data is less than said first predetermined number of bits.

2. The subrate control channel exchange system according to claim 1, wherein said communications network is an ISDN network; and said bit unit exchange switching means is provided in an ISDN transmission line trunk connected to an ISDN transmission line for connecting said exchange network to said destination terminal unit.

3. The subrate control channel exchange system according to claim 2, wherein:

said ISDN transmission line trunk means comprises:

first switching means, forming part of said bit unit exchange switching means, second switching means for multiplexing B channel data, forming said communications data inputted through said exchange network, with an output of said first switching means, D' channel terminating means for outputting, as D' channel data, control data having a number of bits, said number of bits of said control data being less than said first predetermined number of bits, to said first switching means, Primary Rate Interface terminating means for terminating an ISDN primary rate interface and outputting the multiplexing result of said second switching means to said ISDN transmission line, and a first line processor for controlling operations of said D' channel terminating means, said first switching means, said second switching means, and said PRI terminating means; and said subrate exchange trunk means comprises:

third switching means for extracting only the significant bits from said low speed communication data, multiplexing in the time slot corresponding to the channel comprising the predetermined number of bits in the ISDN network, and for demultiplexing said significant bits in the reverse processing order, and a second line processor for controlling said third switching means and outputting data.

4. The subrate control channel exchange system according to claim 3, wherein a sending portion of said third switching means comprises:

first two-port random access memory means (RAM) for storing said low speed communication data in response to a write address for said first two-port RAM means and outputting the multiplexing result;

second two-port random access memory means (RAM) for storing data inputted from said second line processor and outputting said data as a read address for said two-port RAM means based on a real address of said second two-port RAM means; and counter means for outputting the first means write address for said first two-port RAM means and the read address for said second two-port RAM means.

5. The subrate control channel exchange system according to claim 3, wherein a sending portion of said first switching means comprises:

first two-port RAM means for storing an output of said subrate exchange trunk means in response to a write address for said first two-port RAM means and an output of said D' channel terminating means;

selector means for outputting to said second switching means by selecting either an output of said subrate exchange trunk means or an output of said D' channel terminating means stored in said first two-port RAM means, in response to a selection control signal;

second two-port RAM means for storing data inputted from said first line processor and outputting a part of said data for said first two-port means as a read address based on a read address for said second two-port RAM means for said first two-port RAM means and the rest of said data as the selection control signal for said selector means; and counter means for outputting the read address to said second two-port RAM means and the first means write address to said first two-port RAM means.

6. The subrate control channel exchange system according to claim 3, wherein a receiving portion of said first switching means comprises:

first two-port RAM means for storing an output of said second switching means and outputting, to said subrate exchange trunk means, data in a time slot over which only significant bits of said low speed data are multiplexed;

second two-port RAM means for storing an output of said second switching means and outputting communication control data to said D' channel terminating means;

third two-port RAM means for storing data inputted from said first line processor and outputting said data as a write address for said first two-port RAM means and said second two-port RAM means; and counter means for outputting a read address for each of said first two-port RAM means, said second two-port RAM means and said third two-port RAM means.

7. The subrate control channel exchange system according to claim 2, wherein a receiving portion of said third switching means comprises:

first two-port random access memory means (RAM) for storing low speed communication data to be outputted to said source terminal;

second two-port RAM means for storing data inputted from said second line processor and outputting said data as a write address for said two-port RAM means; and counter means for outputting a read address each for said first two-port RAM means and said second two-port RAM means.

8. The subrate control channel exchange system as set out in claim 2, wherein said subrate exchange trunk means comprises:

parallel output serial shift register means for converting serial data forming part of the low speed communications data from said low speed terminal units to parallel data of said predetermined number of bits (n bits) and outputting the parallel data;

latch means for latching an n-bit parallel output from said parallel output serial shift register means;

n-bit shift register means for storing an output of said latch means and outputting the output to said bit unit exchange switching means in said ISDN transmission trunk means; and timing generator means for outputting a timing signal to said parallel output serial shift register means, said latch means and said shift register means.

9. The subrate control channel exchange system according to claim 2, wherein a sending portion of said ISDN transmission line trunk means comprises:

a plurality of D channel processing means having said bit unit exchange switching means for building a frame signal in an HDLC format by multiplexing data outputted by said subrate exchange trunk means together with communication control data for a plurality of D channels;

digital multiplexing means having a memory for temporarily storing a frame signal outputted by said plurality of D channel processing means;

selector means for outputting to a destination terminal unit by selecting either an output of said digital multiplexing means or B channel data inputted through said exchange network; and D channel insertion timing generating means for outputting a timing signal for having said selector means select an output of said digital multiplexing means.

10. The subrate control channel exchange system according to claim 2, wherein a receiving portion of said ISDN transmission line trunk means comprises:

digital demultiplexing means having a memory for temporarily storing a plurality of D channels in a frame inputted from a sending terminal unit; and a plurality of D channel processing means for demultiplexing data, to be outputted to said subrate exchange trunk means, from control data in a plurality of D channels outputted by said digital demultiplexing means.

11. The subrate control channel exchange system according to claim 8, wherein:

a frame transmitted from a sending portion to a receiving portion in said ISDN transmission line trunk means is in an m B+n D format, where m and n are integers, in which at least one part of n D channel data are inserted after each group of m B channel data which is divided into a plurality of groups.

12. A subrate control channel exchange system for use with an exchange device having subrate exchange trunk means for extracting only significant bits from low speed communications data applied from a plurality of low speed terminal units over an exchange network, for multiplexing said significant bits in a time slot corresponding to a single channel comprising a predetermined number of bits in an ISDN network, and for demultiplexing said significant bits in a reverse processing order, said exchange device comprises:

said subrate exchange trunk means comprising:
D' channel terminating means for terminating receipt of D' channel data as transmission signals, when communication control data of fewer than said predetermined number of bits is received, and
a bit unit exchange switching means for multiplexing an output from said D' channel terminating means and significant bits of said low speed data in said time slot.

13. The subrate control channel exchange system according to claim 12, wherein said exchange device comprises ISDN transmission line trunk means connected to an ISDN transmission line for connecting said exchange device to a destination terminal unit; and an output of said bit unit exchange switching means is applied to said ISDN transmission line trunk means over said exchange network.

14. The subrate control channel exchange system according to claim 12, wherein said subrate exchange trunk means has a subrate D channel trunk means and comprises:
D' channel terminating means;
switching means forming said bit unit exchange switching means; and a line processor for controlling the operations of said D' channel terminating means and said switching means.

15. The subrate control channel exchange system according to claim 10, wherein:

a frame transmitted from sending portion to a receiving portion in said ISDN transmission line trunk means is in an m B+n D format, where m and n are integers, in which at least one part of n D channel data are inserted after each group of m B channel data which is divided into a plurality of groups.

* * * * *

UNITED STATES PATENT AND TRADEMARK OFFICE
CERTIFICATE OF CORRECTION

PATENT NO. : 5,467,353
DATED : November 14, 1995
INVENTOR(S) : Fukuda

It is certified that error appears in the above-indentified patent and that said Letters Patent is hereby corrected as shown below:

Col. 3, line 37, change "said" to --the--.
Col. 5, line 4, after "bits" insert --,--.
Col. 6, line 49, after "channel" insert --,--.
Col. 8, line 22, delete ".".
Col. 10, line 4, delete "."
Col. 11, line 35, change "OO" to --EO--.
Col. 15, line 12, delete "," insert a hyphen.

Signed and Sealed this

Fifth Day of March, 1996

*Attest:*

BRUCE LEHMAN

*Attesting Officer*     Commissioner of Patents and Trademarks